(12) United States Patent
Smith et al.

(10) Patent No.: US 8,777,016 B2
(45) Date of Patent: Jul. 15, 2014

(54) MATERIAL SEPARATOR SYSTEMS

(75) Inventors: Roger G. Smith, Lake Oswego, OR (US); Jason D. Gerard, Fairview, OR (US)

(73) Assignee: Construction Equipment Company, Tualatin, OR (US)

( * ) Notice: Subject to any disclaimer, the term of this patent is extended or adjusted under 35 U.S.C. 154(b) by 396 days.

(21) Appl. No.: 13/274,158

(22) Filed: Oct. 14, 2011

(65) Prior Publication Data
US 2012/0031819 A1 Feb. 9, 2012

Related U.S. Application Data

(63) Continuation-in-part of application No. 12/291,237, filed on Nov. 7, 2008, now Pat. No. 8,151,993, which is a continuation-in-part of application No. 12/151,781, filed on May 8, 2008, now Pat. No. 7,500,566, which is a continuation-in-part of application No. 11/985,211, filed on Nov. 13, 2007, now Pat. No. 7,500,565, which is a continuation-in-part of application No. 11/600,403, filed on Nov. 15, 2006, now Pat. No. 7,497,336.

(51) Int. Cl.
*B03B 5/62* (2006.01)
*B03B 5/40* (2006.01)
*B03B 11/00* (2006.01)

(52) U.S. Cl.
CPC ............. *B03B 5/40* (2013.01); *B01D 2201/265* (2013.01); *B03B 11/00* (2013.01)
USPC ............................ 209/173; 209/162; 198/586

(58) Field of Classification Search
USPC ........ 209/17, 155, 162, 172, 172.5, 173, 208; 210/521, 522, 538, 221.1; 241/20; 198/460.2, 586, 588, 812
See application file for complete search history.

(56) References Cited

U.S. PATENT DOCUMENTS

| | | | |
|---|---|---|---|
| 1,231,495 A * | 6/1917 | Cleaver et al. | 198/497 |
| 3,428,164 A | 2/1969 | Lovegreen | |
| 4,012,316 A | 3/1977 | Ostlund et al. | |
| 4,375,264 A | 3/1983 | Porter | |

(Continued)

OTHER PUBLICATIONS

Flo-N-Go! Specifications, http://www.flocait.com/fng-20.html, printed from Flo-Cait website Aug. 31, 2006, 3 pages.

(Continued)

*Primary Examiner* — Joseph C Rodriguez
(74) *Attorney, Agent, or Firm* — Schwabe, Williamson & Wyatt, P.C.

(57) ABSTRACT

Embodiments provide a vehicle for separating a mixed debris stream. The vehicle may include an elongate vehicle frame; a separating structure mounted on the vehicle frame and configured to contact the mixed debris stream with a fluid stream to separate the mixed debris stream into at least a first debris stream and a second debris stream; a feed structure for transporting the mixed debris stream to the separating structure at a delivery location; a first conveyor configured to receive the first debris stream at a receiving location; and a second conveyor configured to receive the second debris stream. At least one of the delivery location of the mixed debris stream, the receiving location of the first debris stream, and/or an ejection angle of the fluid stream may be adjustable.

18 Claims, 12 Drawing Sheets

(56) References Cited

U.S. PATENT DOCUMENTS

| | | |
|---|---|---|
| 4,560,060 A | 12/1985 | Lenhart |
| 4,750,995 A | 6/1988 | Fogerson |
| 4,813,618 A | 3/1989 | Cullom |
| 4,858,769 A | 8/1989 | Devries |
| 5,110,454 A | 5/1992 | Parker et al. |
| 5,234,564 A | 8/1993 | Smith |
| 5,234,608 A | 8/1993 | Duff |
| 5,421,147 A | 6/1995 | Holden et al. |
| 5,992,642 A | 11/1999 | Ota |
| 6,171,488 B1 | 1/2001 | Morse et al. |
| 6,962,255 B2 | 11/2005 | Tse |
| 7,017,753 B2 | 3/2006 | Tse |
| 7,223,059 B2 | 5/2007 | Smith et al. |
| 7,264,190 B2 | 9/2007 | Smith et al. |
| 7,273,150 B2 | 9/2007 | Fridman et al. |
| 7,296,676 B2 | 11/2007 | Smith et al. |
| 7,314,140 B2 | 1/2008 | Cullom et al. |
| 8,167,136 B2 * | 5/2012 | Betti .............................. 209/620 |
| 2005/0035037 A1 | 2/2005 | Lindsey et al. |
| 2006/0065585 A1 | 3/2006 | Cullom et al. |
| 2008/0060979 A1 | 3/2008 | Cullom et al. |

OTHER PUBLICATIONS

Office Action, issued in Canadian Patent Application No. 2610531, mailed Mar. 19, 2010, 3 pages.

Office Action, issued in U.S. Appl. No. 11/600,403, mailed Jul. 23, 2008, 14 pages.

Office Action, issued in U.S. Appl. No. 11/985,211, mailed Jul. 29, 2008, 13 pages.

Office Action, issued in U.S. Appl. No. 12/151,781, mailed Jul. 28, 2008, 12 pages.

Notice of Allowance, issued in U.S. Appl. No. 11/600,403, mailed Jan. 12, 2009, 4 pages.

Notice of Allowance, issued in U.S. Appl. No. 11/985,211, mailed Jan. 16, 2009, 4 pages.

Notice of Allowance, issued in U.S. Appl. No. 12/151,781, mailed Jan. 16, 2009, 6 pages.

Notice of Allowance, issued in U.S. Appl. No. 12/291,237, mailed Dec. 7, 2011, 5 pages.

Office Action, issued in U.S. Appl. No. 12/291,237, mailed Jan. 21, 2011, 11 pages.

Office Action, issued in U.S. Appl. No. 12/291,237, mailed Sep. 28, 2011, 12 pages.

* cited by examiner

MATERIAL SEPARATOR SYSTEMS

CROSS REFERENCE TO RELATED APPLICATIONS

This application is a continuation-in-part of U.S. patent application Ser. No. 12/291,237, filed Nov. 7, 2008 and entitled "Material Separator Systems," which is a continuation-in-part of U.S. patent application Ser. No. 12/151,781, filed May 8, 2008 and entitled "Material Separator Systems," which is a continuation-in-part of U.S. patent application Ser. No. 11/985,211, filed Nov. 13, 2007 and entitled "Material separator Systems," which is a continuation-in-part of U.S. patent application Ser. No. 11/600,403, filed Nov. 15, 2006 and entitled "Material Separator System." The complete disclosures of the above applications are herein incorporated by reference for all purposes.

TECHNICAL FIELD

Embodiments herein relate to the field of material separator systems.

BACKGROUND

Various systems are used for processing dirt and/or debris mixtures, which may include rocks, concrete pieces, wood pieces, stones, discarded hardware, and other types of dirt and/or debris. That processing may include feeding and screening the dirt and/or debris mixtures into multiple piles. For example, one pile may contain essentially soil, and other piles may contain material of different sizes with at least some of those piles having commercial value as recycled product(s). Examples of systems for processing dirt and/or debris mixtures are illustrated in U.S. Pat. Nos. 5,234,608; 7,223,059; 7,264,190; and 7,296,676. The complete disclosures of those patents are herein incorporated by reference for all purposes.

Some debris mixtures may contain debris of different materials, such as wood pieces and rock. Those debris mixtures need to be separated from each other to have commercial value as recycled product(s) and/or for further processing. Various equipment may be used that separate the debris mixtures into separate piles, such as a pile primarily composed of wood pieces and another pile primarily composed of rock.

SUMMARY OF THE DISCLOSURE

Various embodiments of a vehicle for separating a mixed debris stream are provided. In some embodiments, the vehicle may include an elongate vehicle frame; a separating structure mounted on the vehicle frame and configured to contact the mixed debris stream with a fluid stream to separate the mixed debris stream into at least a first debris stream and a second debris stream, the separating structure including a mixing area and a fluid ejection assembly, the second debris stream including at least some material of a higher density than material from the first debris stream; a feed conveyor having a discharge end portion and configured to deliver the mixed debris stream to the mixing area of the separating structure at a delivery location; a first conveyor having a feed end portion positioned to receive the first debris stream from the separating structure at a receiving location, and a discharge end portion spaced from the feed end portion of the first conveyor; a second conveyor having a feed end portion positioned to receive the second debris stream from the separating structure, and a discharge end portion spaced from the feed end portion of the second conveyor; and a feed adjusting mechanism configured to selectively adjust the position of the discharge end portion of the feed conveyor, thereby selectively adjusting the delivery location.

Some embodiments of the vehicle may additionally, or alternatively, include a separator adjustment mechanism configured to selectively adjust the position of the feed end portion of the first conveyor, thereby adjusting the receiving location of the first conveyor. Further embodiments may additionally, or alternatively, include a fluid pipe having an end portion adjacent the mixing area and a fluid channeler pivotably connected to the end portion of the fluid pipe, wherein the fluid channeler is configured to be selectively pivoted relative to the end portion of the fluid pipe to adjust an ejection angle of the fluid stream from the end portion of the fluid pipe relative to a horizontal plane.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

FIG. 1 is a side view of a material separator system mounted on a vehicle frame.

FIG. 2 is a side view of the material separator system of FIG. 1 shown without a side of a tank and a portion of the vehicle frame to show internal components of the material separator system.

DETAILED DESCRIPTION OF DISCLOSED EMBODIMENTS

Figure 4:
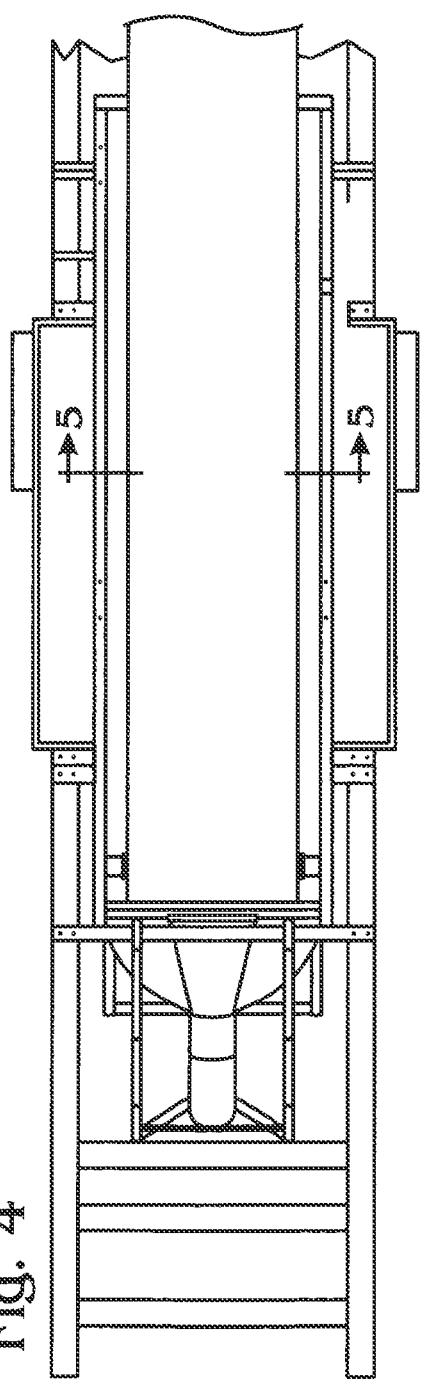
FIG. 4 is a fragmented top view of the material separator system of FIG. 1 shown without an upper conveyor to show a lower conveyor.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "NB" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

In various embodiments, methods, apparatuses, and systems for material separator systems are provided. In exemplary embodiments, a computing device may be endowed with one or more components of the disclosed apparatuses and/or systems and may be employed to perform one or more methods as disclosed herein.

Figures 1, 2:
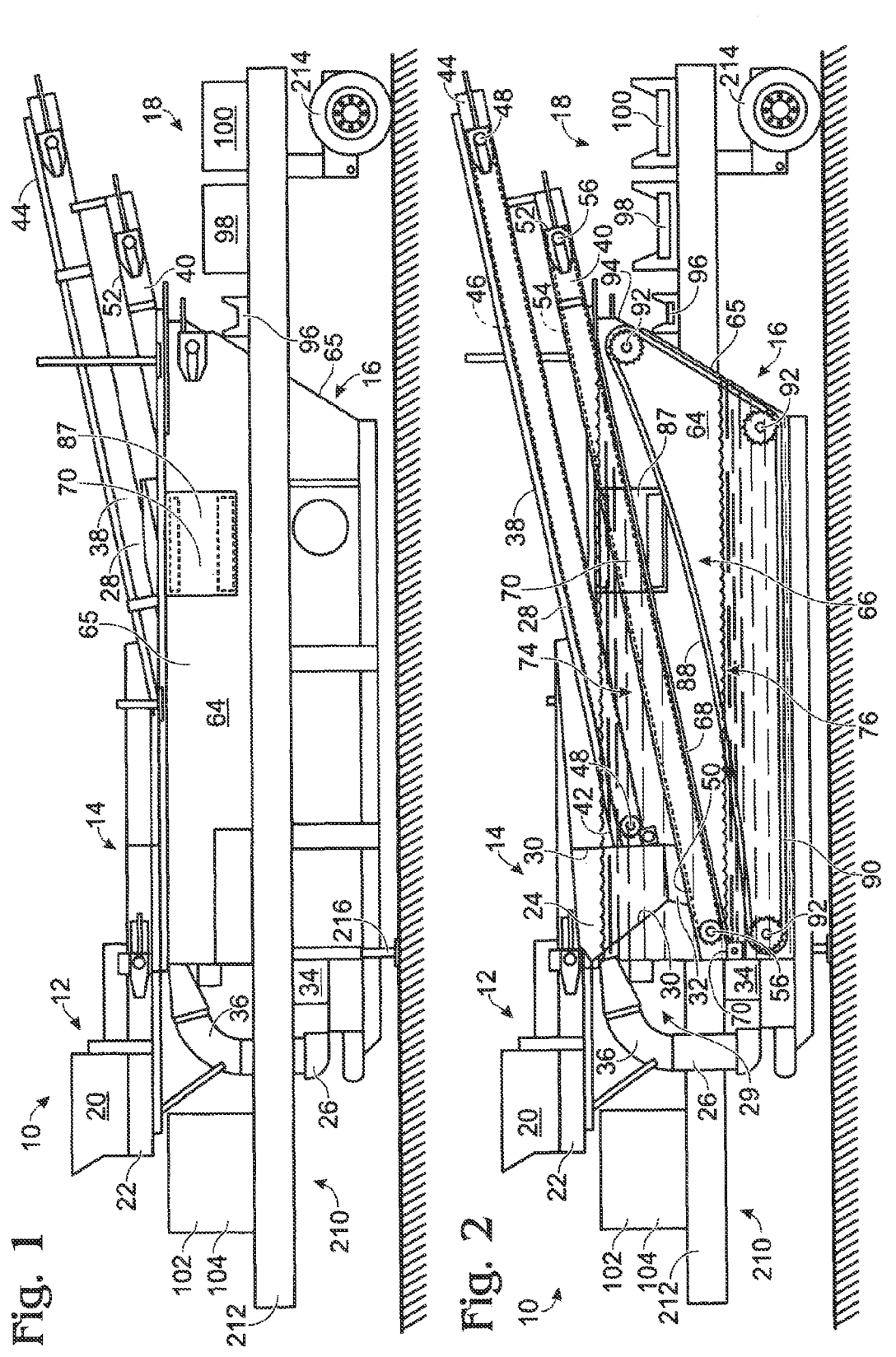

FIG. 1 depicts some embodiments of a material separator system 10. The material separator system may be supported by a vehicle 210. Vehicle 210 may include an elongate vehicle frame 212 and transport wheels 214, which may support the frame for movement over the ground. The vehicle also may include one or more lifting legs 216, which may selectively raise and/or lower material, separator system 10 and/or vehicle frame 212. For example, the lifting legs may allow a collection tank of the material separator system to rest on the ground. Although material separator system 10 is shown to be supported by a particular vehicle, the material separator system may be supported by any suitable structure configured to enable a user to relocate and/or move the material separator system to one or more desired locations. For example, material separator system 10 may be mounted on a vehicle with transport tracks. Additionally, although vehicle 210 is shown to include lifting legs 216, the vehicle may include any suitable structure configured to allow a user to selectively raise and/or lower the material separator system relative to the ground. For example, the vehicle may additionally, or alternatively, include one or more airbag axles that may support one or more of the transport wheels.

Figure 7:
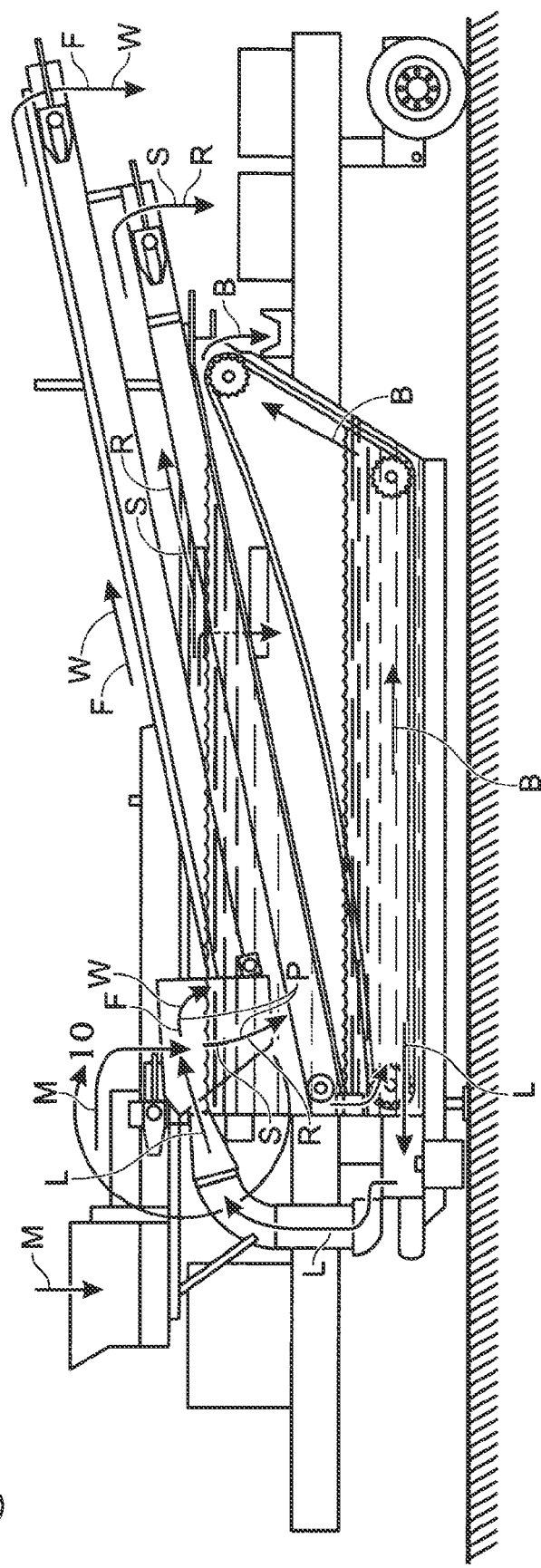
FIG. 7 is a side view of the material separator system of FIG. 1 shown without a side of a tank and a portion of the vehicle frame to show an illustrative example of the flow of various streams when the material separator system is in operation.

Material separator system 10 may include any suitable structure configured to receive a mixed debris stream M and to at least partially separate that stream into a plurality of debris streams P, such as a first debris stream F and a second debris stream S, as shown in FIG. 7. Material or debris in the debris streams may differ in density, weight, size, length, width, thickness, and/or any suitable properties and/or characteristics. For example, the second debris stream may include at least some material of a higher density than material from the first debris stream.

An illustrative example of a mixed debris stream M may include wood pieces and rock. When the mixed debris stream includes those components, then the material separator system may be configured to separate that stream into at least a wood debris stream W and a rock debris stream R. The wood debris stream may include at least a substantial portion of the wood pieces from mixed debris stream M. Additionally, or alternatively, the rock debris stream may include at least a substantial portion of the rock from mixed debris stream M. Although the mixed debris stream is discussed to include wood pieces and rock, the mixed debris stream may alternatively, or additionally, include other components such as fibrous material, plants, dirt, gravel, etc. Additionally, although material separator system 10 is discussed to separate mixed debris stream M into wood debris stream W and rock debris stream R, the material separator system may additionally, or alternatively, be configured to separate the mixed debris stream into other suitable streams.

Moreover, although material separator system 10 is discussed to separate mixed debris stream M into two debris streams, the material separator system may be configured to separate the mixed debris stream into three or more streams. Furthermore, although material separator system 10 is discussed to separate mixed debris stream M into plurality of streams P, the material separator system may separate only one or more portions of the mixed debris stream into the plurality of streams. Additionally, although material separator system 10 is discussed to receive a mixed debris stream, the material separator system may receive two or more debris streams, each of those streams may be mixed and/or at least substantially include one or more types of debris.

An illustrative example of material separator system 10 may include a feed structure 12, a separating structure 14, a fluid collection structure 16, and a conveying structure 18, as shown in FIGS. 1-2. Feed structure 12 may include any suitable structure configured to feed a mixed debris stream to a mixing tank of the separating structure. For example, feed structure 12 may include a feed hopper 20 and a feed conveyor 22, as shown in FIG. 1.

The feed hopper may be configured to receive mixed debris stream M from any suitable source(s), such as one or more material processing systems. Feed conveyor 22 may be configured to receive mixed debris stream M from the feed hopper and to transport the mixed debris stream to separating structure 14. Although feed structure 12 is shown to include feed hopper 20 and feed conveyor 22, the feed structure may include any suitable structure configured to feed mixed debris stream M to the separating structure.

Separating structure 14 may be mounted on, supported by, or operatively connected to the vehicle frame. The separating structure may include any suitable structure configured to separate mixed debris stream M into at least first debris stream F and second debris stream S. For example, separating structure 14 may include a mixing area or mixing tank 24, a fluid ejection assembly 26, and a conveying assembly 28, as shown in FIG. 2. The mixing tank and the fluid ejection assembly also may be referred to as a separating assembly 29. Mixing tank 24 may include any suitable structure configured to contact mixed debris stream M with one or more fluid streams L from fluid ejection assembly 26 to separate the mixed debris stream to at least first debris stream F and second debris stream S. For example, mixing tank 24 may include one or more walls 30 and one or more skirts 32, which may at least partially contain the mixed debris stream and the fluid streams. In some embodiments, mixing tank 24 may be an area within and/or be in fluid communication with an upper portion of a collection tank of the fluid collection structure.

In some embodiments, where the mixed debris stream M is contacted by the one or more fluid streams, at least some of the plurality of streams may include fluid from the fluid streams. For example, at least one of the first debris stream and the second debris stream may include at least some fluid from the fluid stream. Alternatively, the wood debris stream may include at least some fluid from the fluid stream and/or the rock debris stream may include at least some fluid from the fluid stream.

Fluid ejection assembly 26 may include any suitable structure configured to receive fluid from fluid collection structure 16 and to eject one or more fluid streams L to the mixing tank. The fluid streams may include any suitable fluid(s). For example, the fluid streams may at least substantially include water. When the fluid streams at least substantially include water, fluid ejection assembly 26 may be referred to as a water ejection assembly. The fluid ejection assembly may include a fluid pump 34 and a fluid pipe 36, as shown in FIG. 2. The fluid pump may move fluid from the fluid collection structure to the fluid pipe. Fluid pipe 36 may direct fluid from the fluid pump to eject one or more fluid streams L to mixing tank 24.

Although fluid ejection assembly 26 is shown to include a single pump and a single pipe, the fluid ejection assembly may include two or more pumps and/or two or more pipes. Additionally, although fluid ejection assembly 26 is shown to receive fluid from the fluid collection structure, the fluid ejection assembly may alternatively, or additionally, receive fluid from any suitable source(s). Moreover, although fluid ejection assembly 26 is shown to include fluid pump 34 and fluid pipe 36, the fluid ejection assembly may include any suitable structure to receive fluid from fluid collection structure 16 and to eject one or more fluid streams L to the mixing tank.

Figure 10:
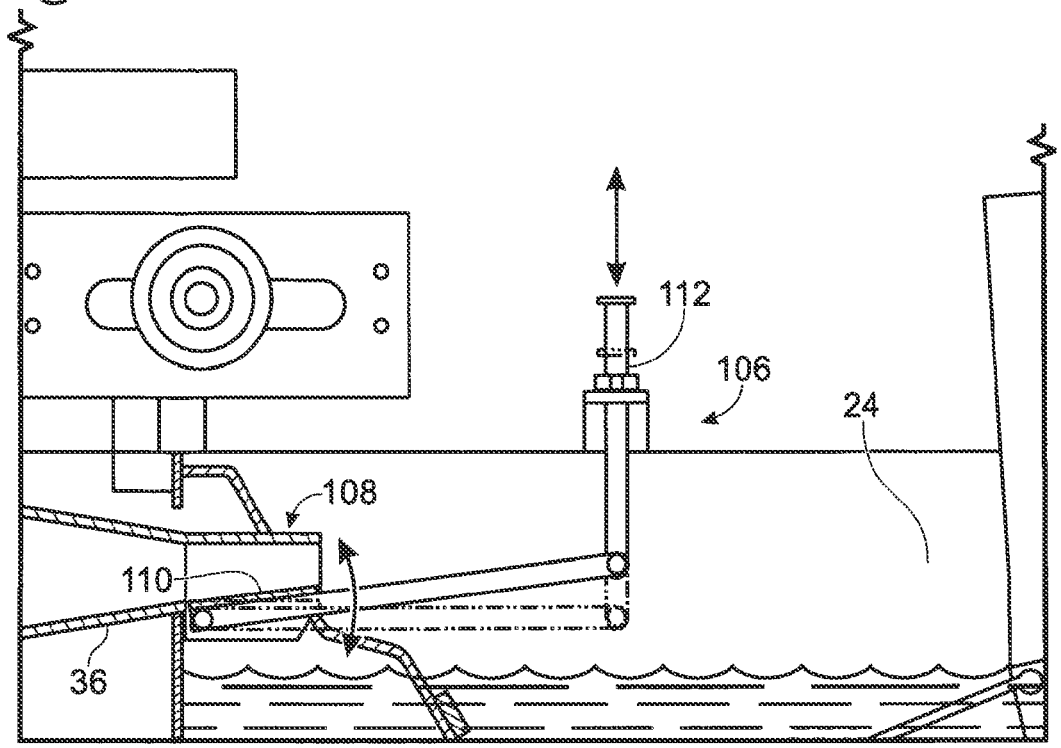
FIG. 10 is a partial view of the material separator system of FIG. 1 shown without a side of a tank to show components of a separating structure of the material separator system.
Figure 11:
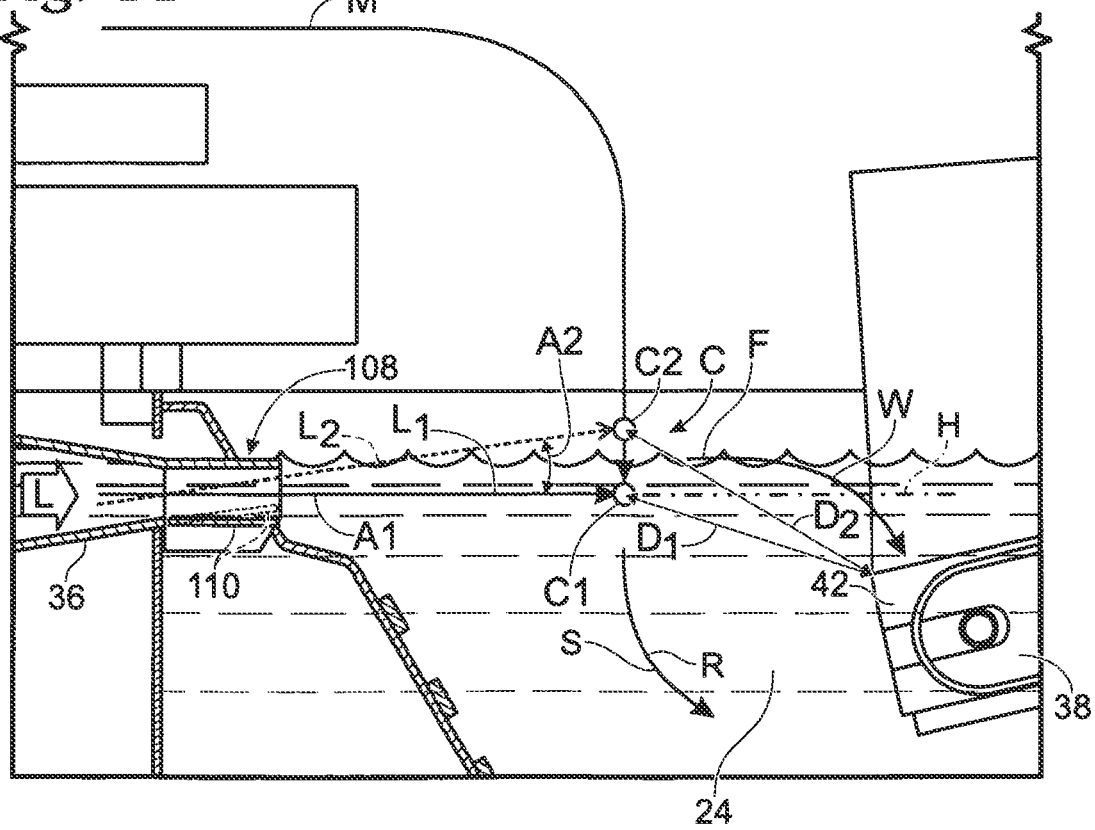
FIG. 11 is the partial view of FIG. 10 showing another illustrative example of the flow of various streams when the material separator system is in operation.

As shown in FIGS. 10-11, the fluid ejection assembly may include a fluid channeler 106 configured to selectively direct the one or more fluid streams entering mixing area 24 among a plurality of ejection angles relative to a suitable reference plane, such as a horizontal plane H. For example, fluid channeler 106 may include a flap 110 and a control mechanism 112. The flap may be mounted and/or movably connected on any suitable portion of the fluid ejection assembly, such as an end portion 108 of fluid pipe 36. For example, the flap may be pivotally connected to the end portion of the fluid pipe and may be configured to be selectively pivoted by the control mechanism to selectively direct the one or more fluid streams among a plurality of ejections angles, such as ejection angles A1 and A2.

In some embodiments, the one or more fluid streams may contact the mixed debris stream at a contact region C spaced from the feed end portion of the first conveyor. The fluid channeler may then be configured to selectively direct the one or more fluid streams to move the contact region among a plurality of locations relative to feed end portion 42 of first conveyor 38. For example, the fluid channeler may direct fluid stream L1 to contact the mixed debris stream at contact region C at a first location C1 (which may be adjacent to feed end portion 42 and/or at a first distance D1 from feed end portion 42), and/or direct fluid stream L2 to contact the mixed debris stream at contact region C at a second location C2 (which may be spaced from feed end portion 42 relative to the first location and/or at a second distance D2 from feed end portion 42. First distance D1 may be less than, equal to, or greater than second distance D2.

Figure 14:
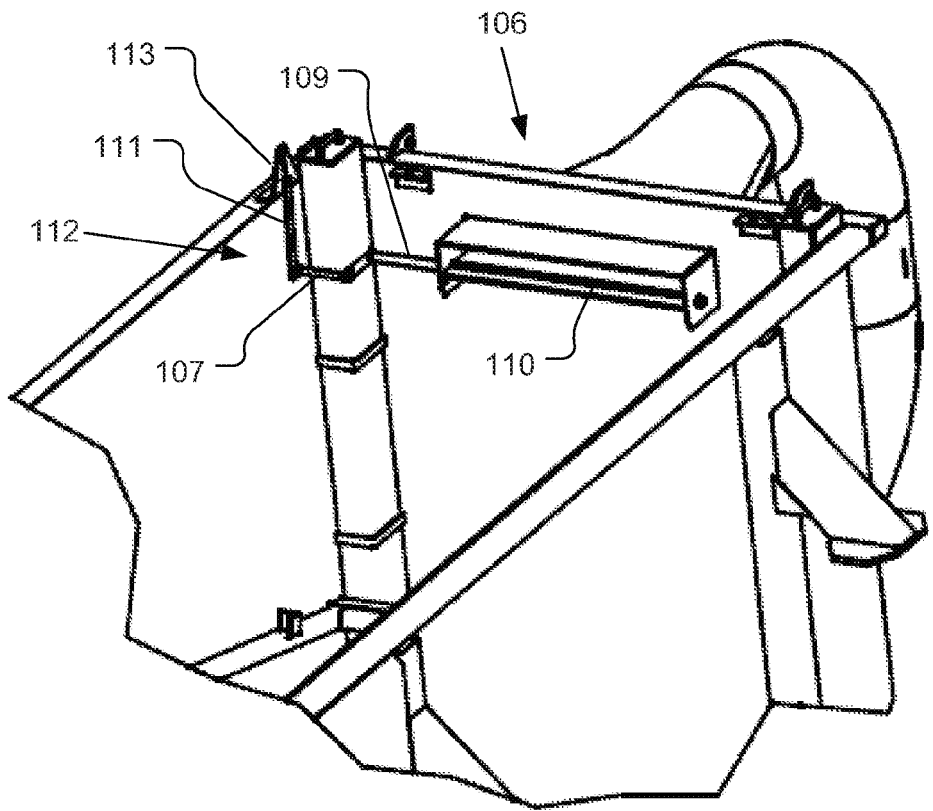
FIG. 14 is a partial isometric view of a fluid ejection assembly of a material separator system.
Figure 15:
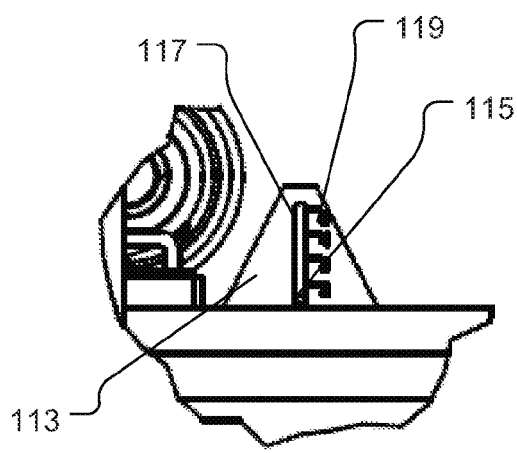
FIG. 15 is a partial side view of the fluid ejection assembly of FIG. 14.
Figure 16:
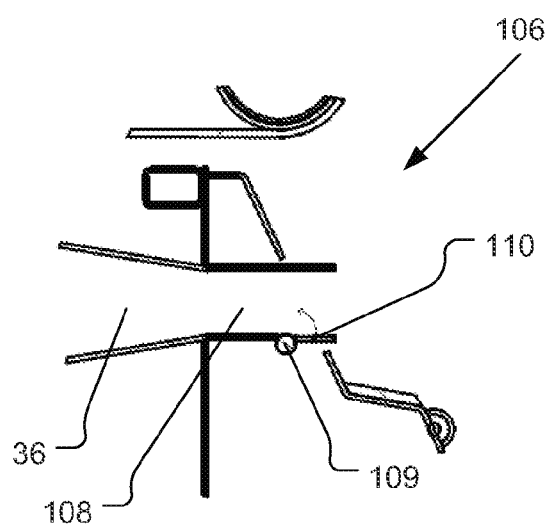
FIG. 16 is a cross-sectional view of the fluid ejection assembly of FIG. 14.

As shown in FIGS. 14, 15 and 16, an alternative embodiment of fluid channeler 106 may include an alternative control mechanism 112. Control mechanism 112 may include a pivot lever 107 coupled to a rotating rod 109 of flap 110. An adjustment arm 111 may be coupled to pivot lever 107 and extend upwards to an adjustment scale 113. The adjustment arm 111 may include a threaded connection 115 at the top end of adjustment arm 111. A screw handle may couple to the threaded connection. The threaded connection 115 and/or screw handle may be disposed through a slot 117 in adjustment scale 113. The position of the screw handle may be adjusted within slot 117 and then tightened against adjustment scale 113 to keep the adjustment arm 111 in a particular position. As the screw handle is moved upward, the adjustment arm 111 is moved upward, and pivot lever 107 causes rotating rod 109 to rotate. The rotation of rotating rod 109 causes flap 110 to rotate upward. Conversely, if the screw handle is moved downward with respect to slot 117, adjustment arm 111 is moved downward, and pivot lever 107 causes rotating rod 109 to rotate in the other direction, causing flap 110 to rotate downward. When the adjustment arm 111, and therefore the flap 110 is in the desired position, the screw handle may be tightened against the adjustment scale 113 to maintain the position. Adjustment scale 113 may include demarcations 119 to indicate the relative position of the adjustment arm 111.

An ejection angle or a contact region location may be selected based, at least in part, on one or more properties of the fluid stream and/or mixed debris stream. For example, the contact region location selected may be based, at least in part, on a difference between an average density of material intended to be part of the first debris stream, and an average density of material intended to be part of the second debris stream. Based on that difference a larger (or smaller) ejection angle and/or contact region location farther from (or closer to) the feed end portion of the first conveyor may be required to ensure sufficient or adequate separation of material from the mixed debris stream. In some embodiments, a smaller difference in average density between the materials to be separated may require a higher ejection angle (i.e., a higher upward angle from the horizontal plane).

Although fluid channeler 106 is shown to include flap 110 and control mechanism 112, the fluid channeler may include any suitable structure configured to selectively direct the one or more fluid streams entering the mixing area among a plurality of ejection angles and/or to selectively direct the one or more fluid streams to move the contact region among a plurality of locations relative to the feed end portion of the first conveyor. Additionally, although the plurality of ejection angles include ejection angle A1, which is shown to be zero or parallel to the horizontal plane, and ejection angle A2, which is shown to be positive or above the horizontal plane, the plurality of ejection angles may alternatively, or additionally, include any suitable angles, including ejection angles that are negative or below the horizontal plane.

Moreover, although separating structure 14 is shown to include fluid channeler 106, feed structure 12 may alternatively, or additionally, include a fluid channeler. For example, the fluid channeler of the feed structure may be configured to selectively direct the mixed debris stream entering the mixing area among a plurality of ejection angles relative to any suitable reference plane and/or to move a contact region among a plurality of locations.

Figure 3:
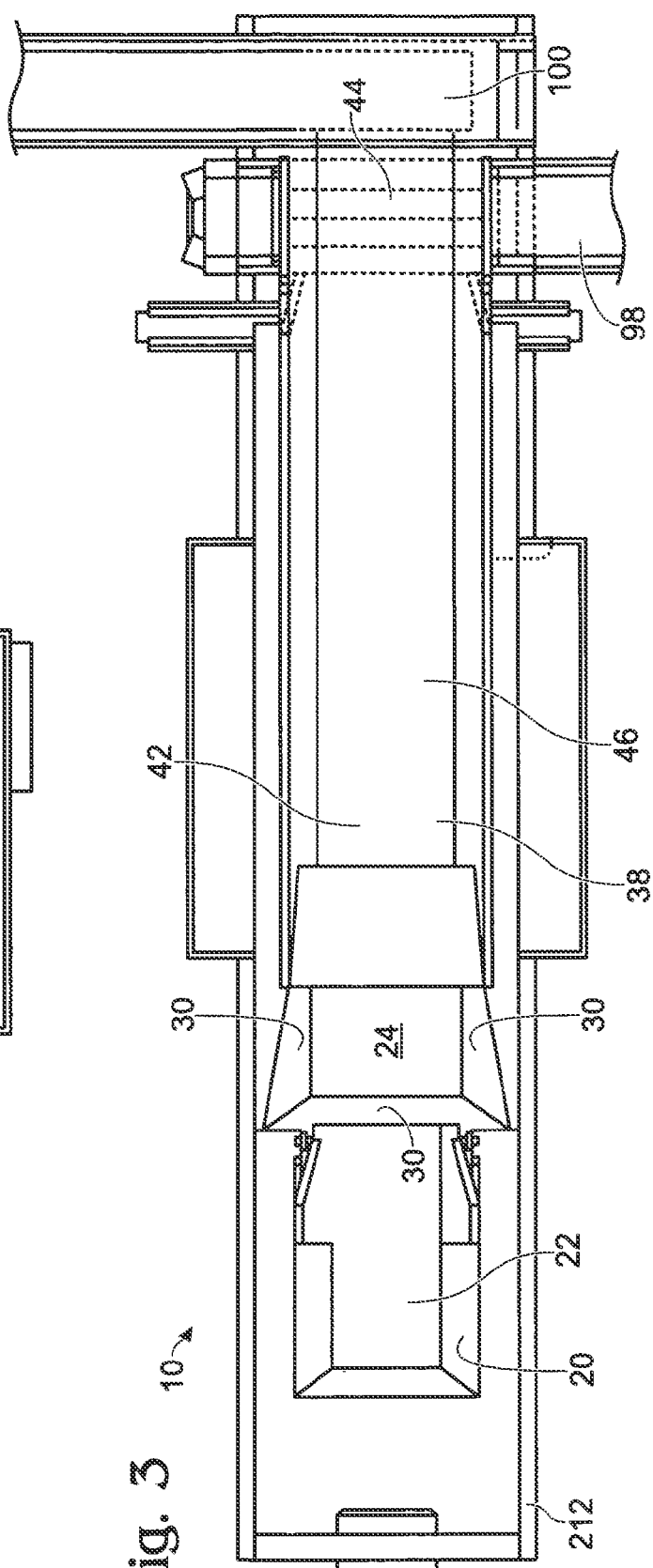
FIG. 3 is a top view of the material separator system of FIG. 1.
Figure 5:
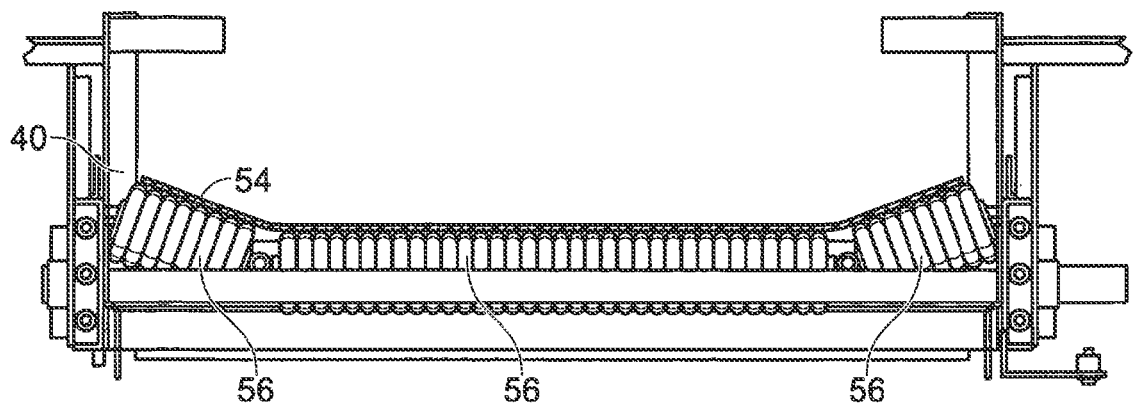
FIG. 5 is a sectional view of the lower conveyor taken along lines 5-5 in FIG. 4 of the material separator system of FIG. 1.

Conveying assembly 28 may include any suitable structure configured to transport at least the first and second debris streams away from the mixing tank. For example, the conveying assembly may include a first conveyor 38 and a second conveyor 40, as shown in FIGS. 2-4. The first conveyor may include a feed end portion 42 and a discharge end portion 44, and may be configured to transport the first debris stream (such as the wood debris stream) from the feed end portion to the discharge end portion. Feed end portion 42 may be disposed within or adjacent the mixing tank to receive the first debris stream and/or disposed within or adjacent an upper tank or upper portion of a collection tank of the fluid collection structure (discussed further below), and discharge end portion 44 may be spaced from the feed end portion, as shown in FIGS. 2-3. In some embodiments where the first debris stream includes the wood debris stream, the first conveyor may be referred to as a wood conveyor. Additionally, first conveyor 38 may include a first conveyor belt 46 and first conveyor rollers 48, as shown in FIGS. 2-3. The first conveyor rollers may be configured to move the first conveyor belt.

Second conveyor 40 may include a feed end portion 50 and a discharge end portion 52, and may be configured to transport the second debris stream (such as the rock debris stream) from feed end portion 50 to discharge end portion 52. Feed end portion 50 may be disposed within or adjacent the mixing tank and/or disposed within or adjacent an upper tank or upper portion of a collection tank of the fluid collection structure (discussed further below) to receive the second debris stream, and discharge end portion 52 may be spaced from feed end portion 50, as shown in FIGS. 2 and 4.

In some embodiments, where the second debris stream includes the rock debris stream, the second conveyor may be referred to as a rock conveyor. Additionally, second conveyor 40 may include a second conveyor belt 54 and second conveyor rollers 56, as shown in FIGS. 2 and 4. The second conveyor rollers may be configured to move the second conveyor belt.

First conveyor belt 46 and second conveyor belt 54 may include any suitable type(s) of belt and/or be made of any suitable material(s) configured to move one or more debris streams from the feed end portion to the discharge end portion of the belt(s), and/or to drain at least some fluid from at least one of the first debris stream and the second debris stream, such as to or toward the fluid collection structure (e.g., an upper tank or upper portion of a collection tank). For example, the first conveyor belt and/or the second conveyor belt may include a mesh conveyor belt.

"Mesh conveyor belt," as used herein, refers to a conveyor belt that includes an open structure made of a plurality of members with at least some of the members being overlapped and/or overlaid in a regular and/or irregular pattern. The mesh conveyor belt may include one or more layers of material(s), each of which includes at least a portion with an open structure made of a plurality of members with at least some of the members being overlapped and/or overlaid in a regular and/or irregular pattern. The mesh conveyor belt may be made of any suitable material(s), such as one or more plastic materials, one or more wire materials, and/or one or more rubber materials.

Alternatively, or additionally, the first and/or second conveyor belts may include a non-mesh conveyor belt. "Non-mesh conveyor belt," as used herein, refers to a conveyor belt that is not a mesh conveyor belt, as defined above. The non-mesh conveyor belt may include one or more layers with each layer made of any suitable material(s). When the non-mesh conveyor belt includes "n" number of layers, up to "n−1" of those layers may at least partially include an open structure made of a plurality of members with at least some of the members being overlapped and/or overlaid in a regular and/or irregular pattern. Additionally, the non-mesh conveyor belt may include any suitable top or top layer, such as a flat top, friction top, rib top, etc.

The non-mesh conveyor belt may be made of any suitable material(s). For example, the non-mesh conveyor belt may at least substantially be made of rubber and/or rubber material(s). The non-mesh conveyor belt may include one layer (or ply) or multiple layers (or plies). Additionally, the non-mesh conveyor belt, which is generally indicated at 55 in FIG. 6, may include a plurality of perforations and/or holes 58, and a plurality of retaining members 60. The plurality of perforations and/or holes may be configured to drain at least some fluid from at least one of the first debris stream and the second debris stream, such as to or toward the fluid collection structure. The holes may be any suitable size, such as 318 inches in diameter, and/or may be spaced any suitable distance, such as 314 inches.

Figure 6:
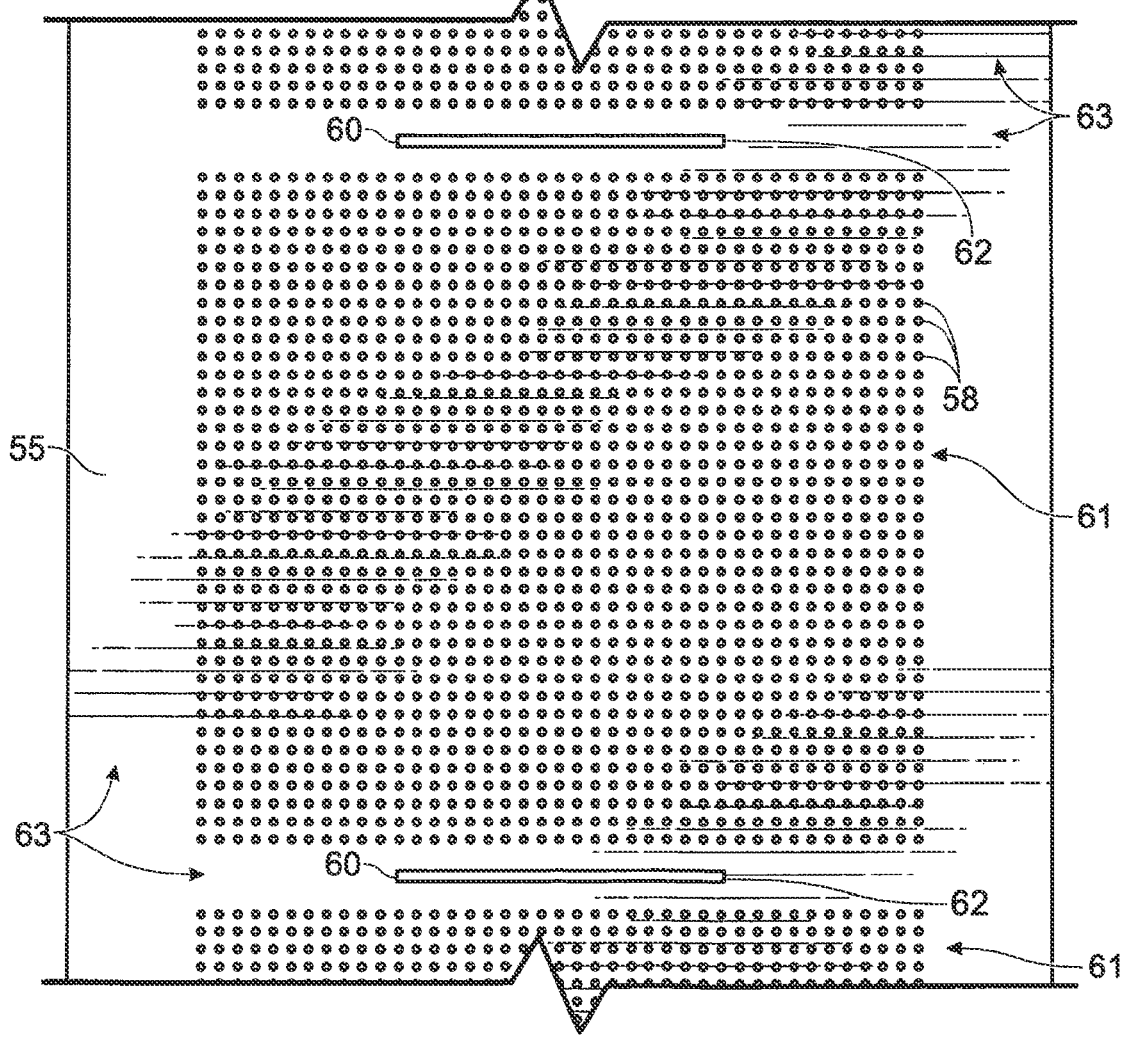
FIG. 6 is a fragmented top view of a conveyor belt of the upper and/or lower conveyor of the material separator system of FIG. 1.

Retaining members 60 may include any suitable structure configured to prevent at least some material of the debris stream from moving towards feed end portion 50. For example, the retaining members may include cleats 62, as shown in FIG. 6. The cleats may be any suitable dimensions, and/or any suitable shape(s). For example, at least some of the cleats may be elongate. Alternatively, or additionally, at least some of the cleats may be chevron-shaped and/or any other suitable shapes.

The holes and/or retaining members may be positioned on the belt in any suitable manner. For example, the holes may be distributed across at least a substantial portion of the second conveyor belt, such as on one or more perforated portions 61 of the second conveyor belt. Alternatively, or additionally, at least some of the holes may be arranged in plural rows and at least some of the retaining members may be disposed between the plural rows on one or more solid portions 63 of the second conveyor belt.

Although holes 58 are shown to be distributed across a substantial portion of the non-mesh conveyor belt, the holes may be distributed across any suitable portion(s) of the non-mesh conveyor belt. Additionally, although the retaining members are shown to be positioned on solid portions 63 of the non-mesh conveyor belt, the retaining members may alternatively, or additionally, be disposed or positioned on any suitable location(s). For example, at least some of the retaining members may be positioned within the perforated portions of the non-mesh conveyor belt. Moreover, although holes 58 are shown to be arranged in plural rows, the holes may alternatively, or additionally, be arranged in any suitable way(s), such as staggered, regular, and/or irregular patterns.

Figure 8:
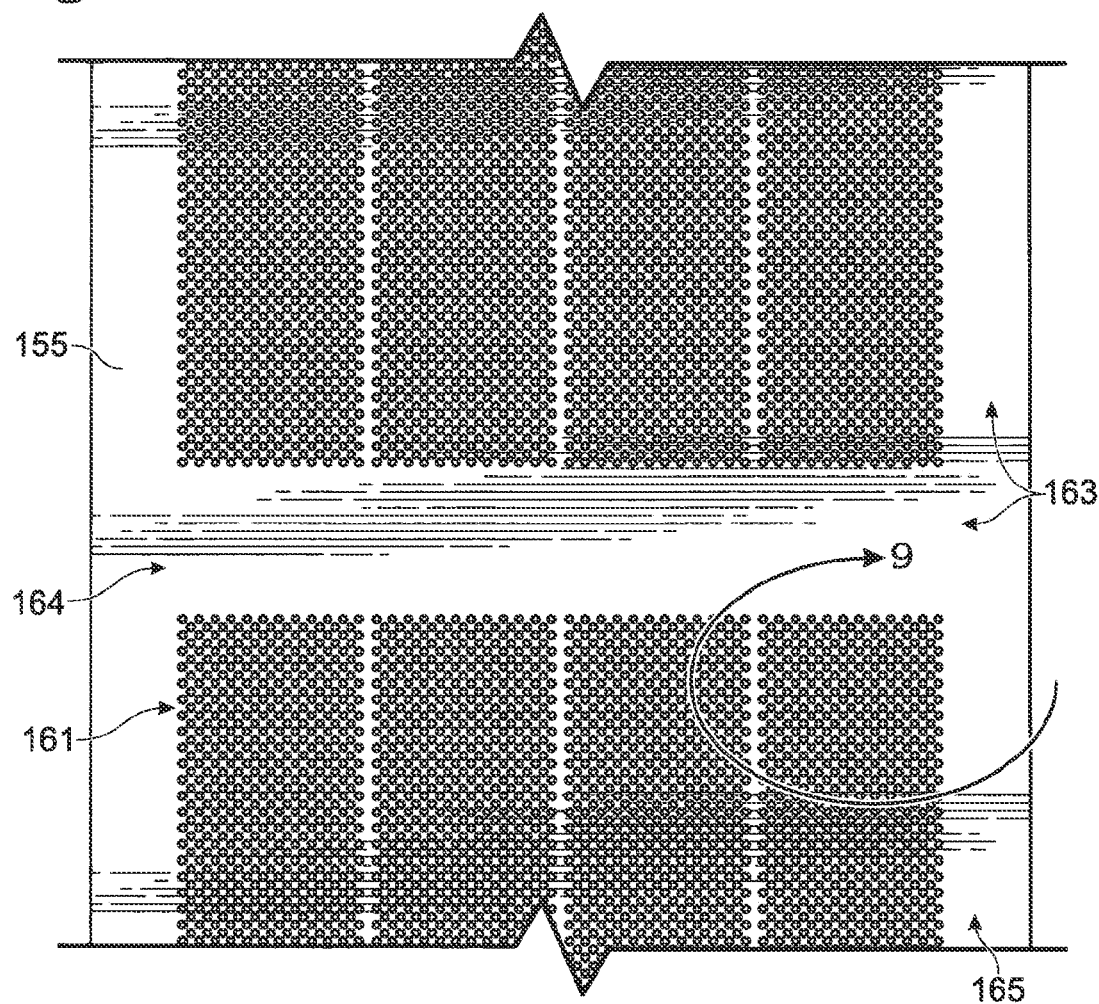
FIG. 8 is a fragmented top view of another example of a conveyor belt of the upper and/or lower conveyor of the material separator system of FIG. 1.
Figure 9:
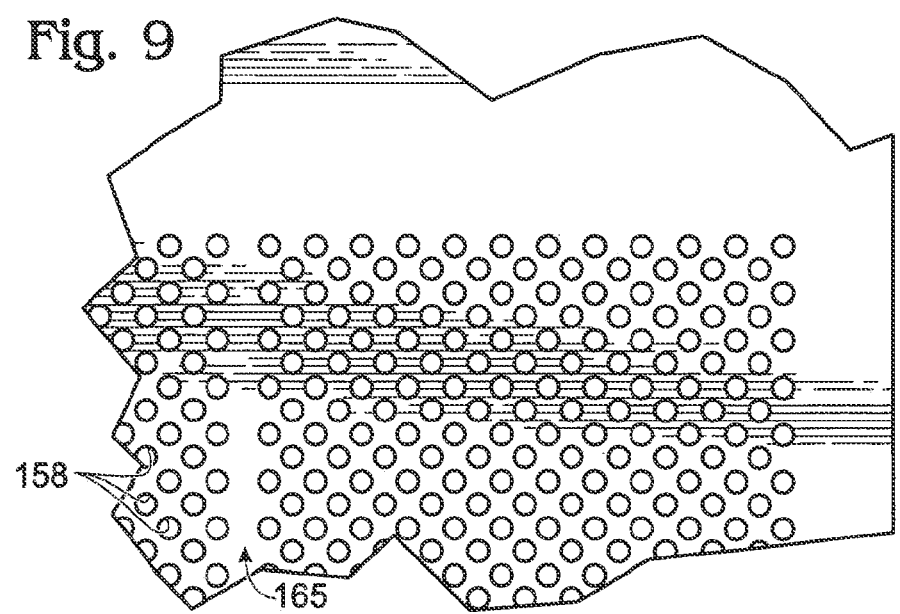
FIG. 9 is a partial view of the conveyor belt of FIG. 8.

Another example of a non-mesh conveyor belt is shown in FIGS. 8-9 and is generally indicated at 155. Non-mesh conveyor belt 155 may be made of any suitable material(s). For example, the non-mesh conveyor belt may at least substantially be made of rubber and/or rubber material(s). The non-mesh conveyor belt may include one layer (or ply) or —multiple layers (or plies). Additionally, non-mesh conveyor belt 155 may include a plurality of perforations and/or holes 158. The plurality of perforations and/or holes may be configured to drain at least some fluid from at least one of the first debris stream and the second debris stream, such as toward the fluid collection structure. The holes may be any suitable size, such as $5/16$ inches in diameter, and/or may be spaced any suitable distance, such as $5/16$ inches.

Holes 158 may be positioned on the belt in any suitable manner. For example, the holes may be distributed across at least a substantial portion of the non-mesh conveyor belt, such as on one or more perforated portions 161 of the non-mesh conveyor belt. Alternatively, or additionally, at least some of holes 158 may be grouped in plural arrays of holes, and at least some of the array of holes may include plural rows of holes. The plural rows of holes may have regular, staggered, and/or irregular patterns. For example, the staggered plural rows of holes are shown in FIGS. 8-9. Additionally, or alternatively, at least some of the array of holes may be spaced from the other array of holes via one or more solid portions 162 of the non-mesh conveyor belt.

The non-mesh conveyor belt may include any suitable number of perforated portions and solid portions. For example, the non-mesh conveyor belt may include one or more horizontal solid portions 164, and one or more vertical portions 165, as shown in FIGS. 8-9. The perforated portions and the solid portions may have any suitable dimensions. For example, for a belt with a 36 inch width (measured perpendicular to the direction of travel for the belt), the perforated portions may have a width of about 7 inches (such as $7^{3}/_{16}$ inches), and the solid portions may have a width of about 0.5 inches (such as $5/16$ inches between perforated portions) to about 3 inches (such as $3^{3}/_{16}$ inches at the perimeter of the belt). Additionally, or alternatively, the horizontal solid portion may have a length (measured in the direction of travel for the belt) of about 6 inches.

Although a particular arrangement for the perforated and solid portions is shown, those portions may be arranged in any suitable way(s). Additionally, although particular dimensions are given for the perforated and solid portions, those portions may have any suitable dimensions. Moreover, although holes 158 are shown to be distributed across a substantial portion of the non-mesh conveyor belt, the holes may be distributed across any suitable portion(s) of that belt. Furthermore, although holes 158 are shown to be arranged in plural staggered rows, the holes may alternatively, or additionally, be arranged in any suitable way(s), such as regular and/or irregular patterns.

First conveyor belt 46 and second conveyor belt 54 may include any of the conveyor belts discussed herein and/or any other suitable conveyor belt(s). For example, first conveyor belt 46 may include non-mesh conveyor belt 155, and second conveyor belt 54 may include non-mesh conveyor belt 55. Alternatively, first conveyor belt 46 may include a plastic mesh belt, and second conveyor belt 54 may include non-mesh conveyor belt 55.

Although first conveyor belt 46 is discussed to include non-mesh conveyor belt 155 or a plastic mesh belt, the first conveyor belt may include any suitable type of belt made of any suitable material(s), such as a wire mesh belt and/or non-mesh conveyor belt 55. Additionally, although second conveyor belt 54 is shown to include non-mesh conveyor belt 55, the second conveyor belt may be any suitable type(s) of belt and/or be made of any suitable material(s). For example, second conveyor belt 54 may alternatively be a mesh conveyor belt, and/or may be made of plastic, wire, and/or any suitable material(s). Moreover, although separating structure 14 is shown to include mixing tank 24, fluid ejection assembly 26, and conveying assembly 28, the separating structure may include any suitable components configured to separate mixed debris stream M into the plurality of debris streams.

Figure 17:
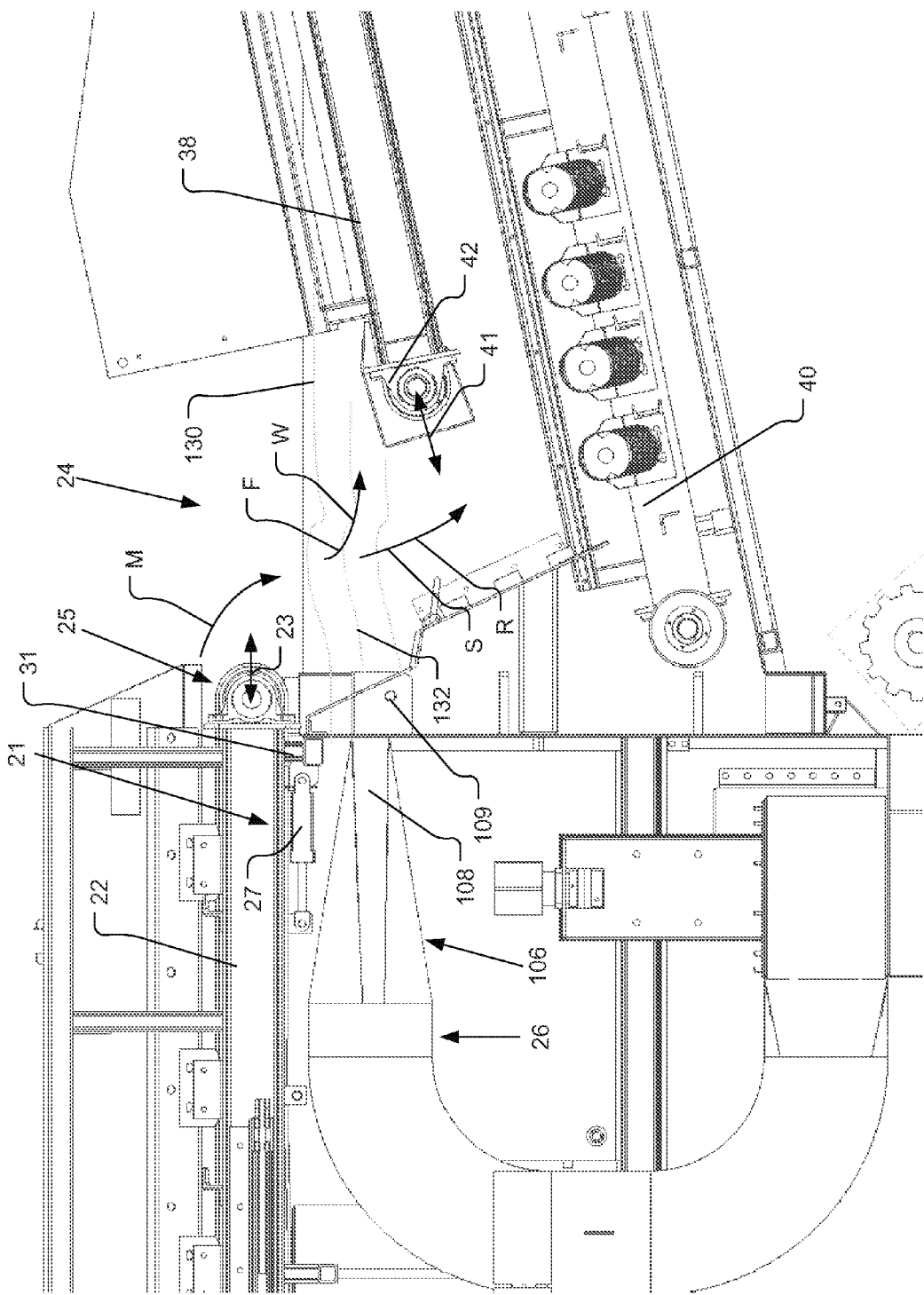
FIG. 17 is a cross-sectional view of a material separator system showing another illustrative example of the flow of various streams when the material separator system is in operation.

In some embodiments, the position of feed conveyor 22 and/or first conveyor 38 may be adjustable, as shown in FIG. 17. For example, the feed conveyor 22 may include a feed adjusting structure 21 to selectively adjust the position of discharge end portion 25, along a feed adjustment axis 23, with respect to the separating structure 14 (e.g., mixing tank 24). The feed adjusting structure 21 may thereby adjust the delivery location where mixed stream M is delivered to mixing tank 24. In some embodiments, as shown in FIG. 17, the position of feed conveyor 22 may be adjusted horizontally. In other embodiments (not shown), the position of feed conveyor 22 may be additionally or alternatively adjustable vertically and/or at an angle between horizontal and vertical. Moving the discharge end portion 25 of feed conveyor 22 closer to the feed end portion 42 of first conveyor 38 may cause first conveyor 38 to pick up a larger proportion of mixed stream M.

Figure 18:
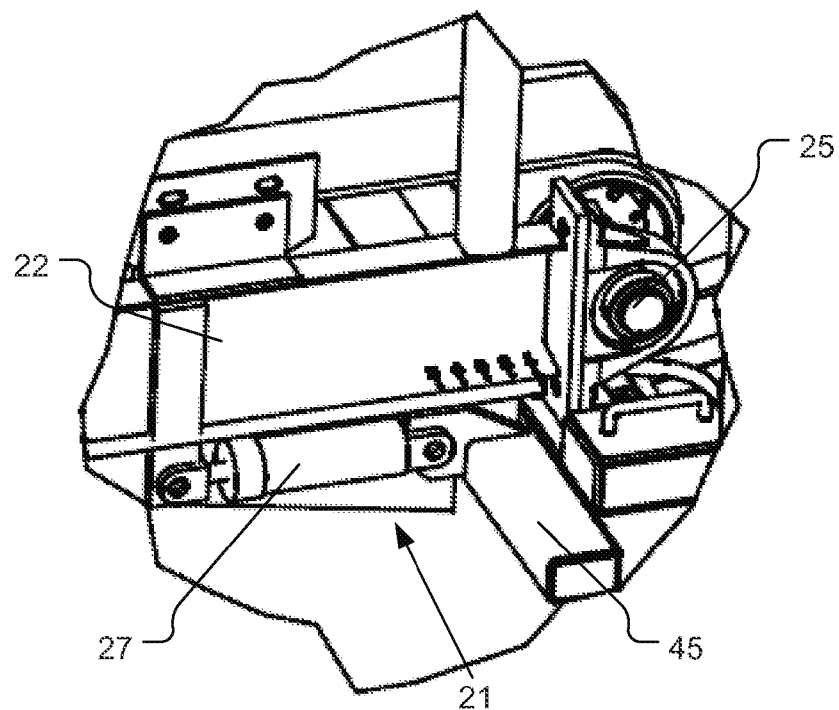
FIG. 18 is a partial isometric view of a feed conveyor and feed adjustment structure of the material separator system.

As shown in more detail in FIG. 18, the feed adjusting structure 21 of feed conveyor 22 may include an adjusting member 27 to adjust the position of discharge end portion 25 relative to mixing tank 24. Adjusting member 27 may be coupled between the feed conveyor 22 and a fixed support structure, such as the mixing tank 24. Adjusting member 27 may be selectively actuated by a control mechanism to change the position of the discharge end 25 of feed conveyor 22 along feed adjustment axis 23. The feed conveyor 22 may slide on a support structure 31 when adjusting member 27 is actuated. In some embodiments, the feed conveyor 22 and/or support structure 31 may include a low-friction coating and/or one or more bearings to facilitate adjustment of feed conveyor 22. Feed conveyor 22 may further include one or more demarcations 31 to indicate the relative position of feed conveyor 22 along the feed adjustment axis 23.

Figure 19:
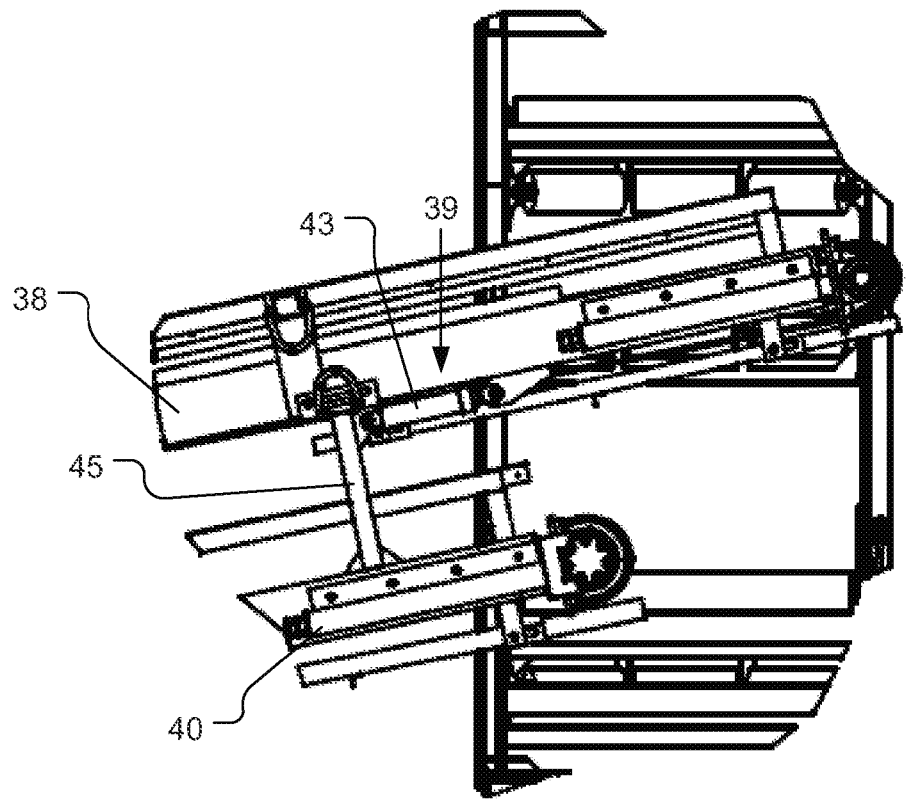
FIG. 19 is a partial side view of the feed conveyor and feed adjustment structure of FIG. 18.

Similarly, in various embodiments, the first conveyor 38 may be adjustable along a separator adjustment axis 41 to adjust the position of feed end portion 42 of first conveyor 38 within mixing tank 24. The first conveyor may include a separator adjustment structure 39 (as shown in FIG. 19) to selectively adjust the position of feed end portion 42 of first conveyor 38 with respect to the mixing tank 24 of the separating assembly 14. In some embodiments the separator adjustment axis 41 may be substantially parallel to the first conveyor belt 46, as shown in FIG. 17. In other embodiments, the first conveyor 38 may be adjustable in any suitable direction, such as horizontally and/or vertically. Adjusting the position of feed end portion 42 of first conveyor 38 may adjust the receiving location of first stream F (i.e., the area where first stream F is picked up by first conveyor 38 and thereby separated from second stream S). Moving the feed end portion 42 of first conveyor 38 closer to the discharge end portion 25 of feed conveyor 22 may cause first conveyor 38 to pick up a larger proportion of mixed stream M.

As shown in more detail in FIG. 19, the separator adjusting structure 39 of first conveyor 38 may include an adjusting member 43 to adjust the position of feed end portion 42 of first conveyor 38. Adjusting member 43 may be coupled between the first conveyor 38 and a fixed support structure 45. Adjusting member 43 may be actuated to change the position of feed end portion 42 of the first conveyor 38 along separator adjustment axis 41. The first conveyor 38 may slide on the support structure 45 when adjusting member 43 is actuated. In some embodiments, the first conveyor 38 and/or support structure 45 may include a low-friction coating and/or one or more bearings to facilitate adjustment of the first conveyor 38.

In various embodiments, the adjusting members 27 or 43 of feed conveyor 22 or first conveyor 38, respectively, may be any type of structure suitable for controllably adjusting the position of the respective conveyor. For example, the adjusting members 27 and/or 43 may include one or more fluid-actuated cylinders (e.g., hydraulic cylinders and/or pneumatic cylinders) and/or servo motors. In embodiments in which the adjusting members 27 or 43 are fluid-actuated cylinders, the adjusting members 27 and/or 43 may be coupled to a valve bank for selectively actuating the adjusting members. For example, if the adjusting members 27 and 43 are hydraulic cylinders, the valve bank may selectively deliver hydraulic fluid to the cylinders. The valve bank may be controlled remotely by the operator using a control mechanism. The control mechanism may communicate wirelessly with the valve bank, such as by radio frequency (RF) communication. Alternatively, or additionally, the valve bank may be controlled locally, such by one or more levers and/or buttons.

Figure 20:
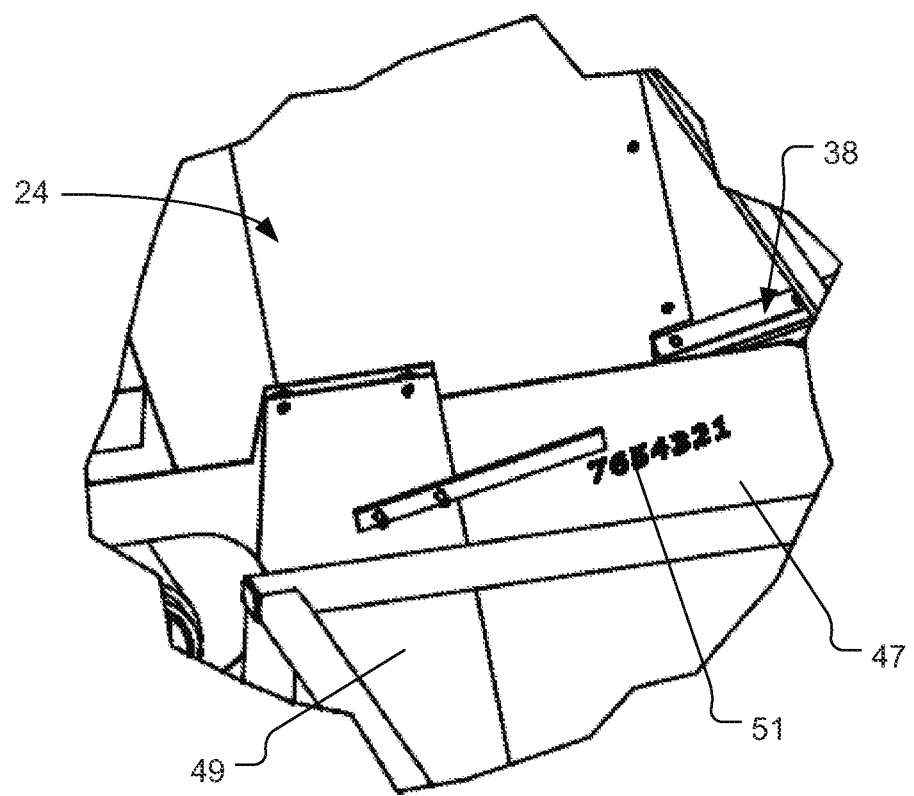
FIG. 20 is a partial isometric view of a mixing tank of a material separator system.
Figure 21:
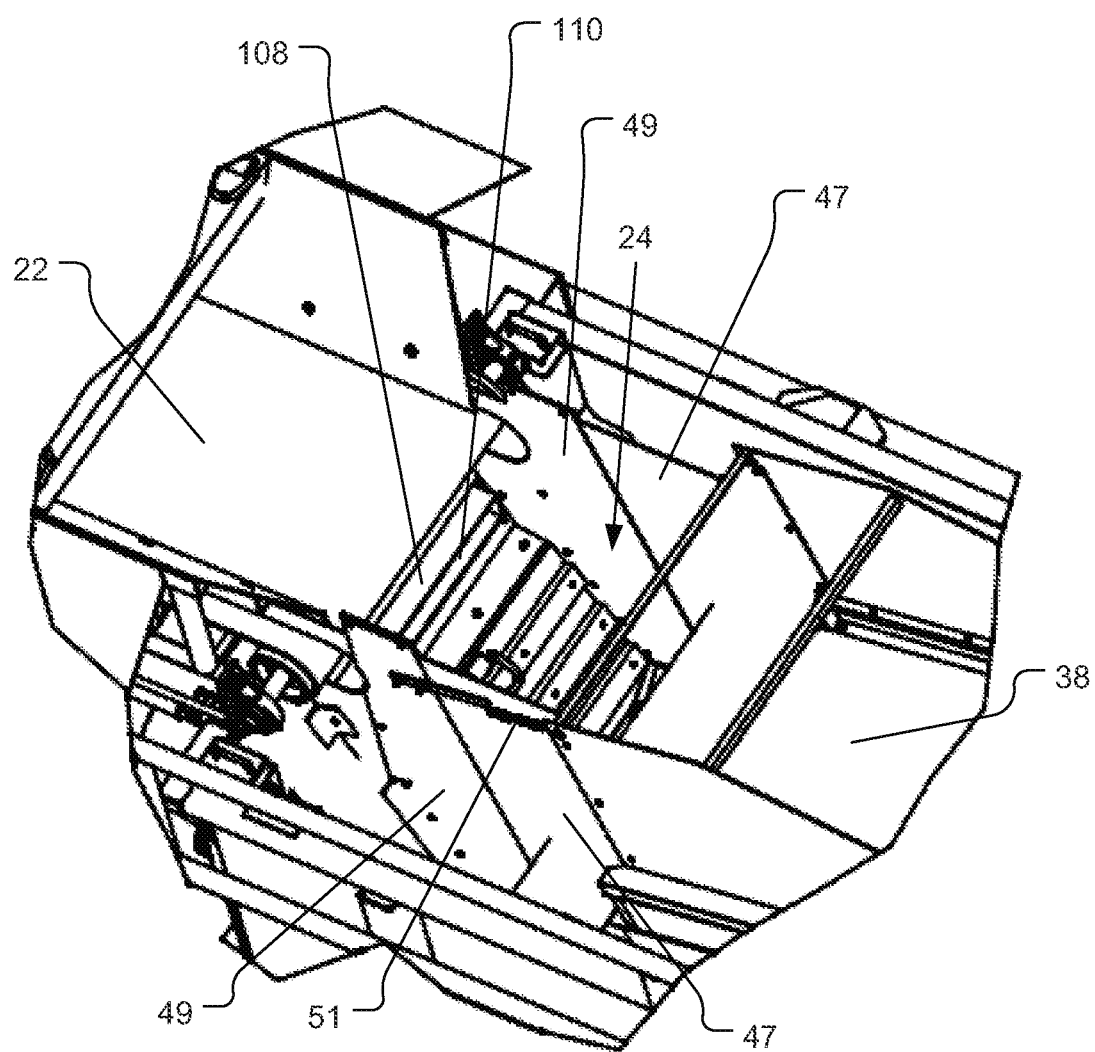
FIG. 21 is a partial isometric view of a material separator system.

As best shown in FIGS. 20 and 21, the first conveyor 38 may include side walls 47. Each side wall 47 may be coupled between a trap wall 49 of the mixing tank 24. The trap walls 49 may allow side walls 47 to move when first conveyor 38 is adjusted while keeping mixing tank 24 enclosed, thereby preventing leakage through the sides of mixing tank 24. The first conveyor 38 may further include one or more demarcations 51 to indicate the relative position of first conveyor 38.

In various embodiments, as shown in FIG. 17, the operator may adjust the fluid channeler 106, feed conveyor 22 and/or first conveyor 38 to optimize the separation of mixed stream M into first stream F (e.g., wood stream W) and second stream S (e.g., rock stream R). As discussed above and shown in FIGS. 14 and 16, the angle of flap 110 of fluid channeler 106 may be adjusted to set the ejection angle of the fluid stream. In some embodiments, as shown in FIG. 17, the fluid channeler 106 may eject fluid below a fluid level 130 in mixing tank 24. In these embodiments, the fluid stream may cause a current 132 in mixing tank 24. The ejection angle of the fluid stream may determine the direction of the current 132. In some embodiments, the ejection angle may be selected based on the difference in density between the one or more materials to be separated. A steeper ejection angle may be used to create an upward current which may facilitate separation of materials that are closer in density.

The operator may additionally, or alternatively, adjust the position of feed conveyor 22 and/or first conveyor 38 to optimize material separation. The discharge end portion 25 of feed conveyor 22 may be moved horizontally closer to the feed end portion 42 first conveyor 38 to separate materials that are closer in density.

The adjustability of fluid channeler 106, feed conveyor 22, and/or first conveyor 38 may allow the material separator system 10 to be used with a wide variety of mixed streams including different materials to be separated. Additionally, the adjustability may allow the material separator system 10 to be used to separate materials that are relatively close in density and/or materials that are water-logged. For example, if the mixed stream includes rock and wood pieces, some or all of the wood pieces may be water-logged. The water-logged wood pieces would have a higher density and tend to sink more in the mixing tank 24 than the non-water-logged wood pieces. The fluid channeler 106, feed conveyor 22, and/or first conveyor 38 may be adjusted so that the water-logged and non-water-logged wood pieces are separated into the wood stream W and transported by the first conveyor 38.

Fluid collection structure 16 may include any suitable structure configured to collect fluid from separating structure 14. When fluid collection structure 16 collects fluid(s) that at least substantially includes water, then the fluid collection structure also may be referred to as a water collection structure. An illustrative example of fluid collection structure 16 may include a collection tank 64, which may include a plurality of tank walls 65 defining an interior 66, an internal wall 68 positioned within that interior, and one or more conduits 70, as shown in FIG. 2. Interior 66 is sized to receive and collect fluid from separating structure 14. The internal wall may at least partially divide interior 66 of the collection tank between an upper portion 74 and a lower portion 76, as shown in FIG. 2. The upper portion and the lower portion also may be referred to as an upper tank and a lower tank, respectively. Upper portion 74 may be configured to receive fluid from separating structure 14.

Although internal wall 68 is shown to divide interior 66 of the collection tank at a particular angle, the internal wall may divide the interior of the collection tank at any suitable angle(s) and/or any suitable location(s). For example, the internal wall may be horizontal to increase a volume of the upper portion relative to the lower portion. Additionally, although fluid collection structure 16 is shown to include a single collection tank with an internal wall, the fluid collection structure may include separate or discrete tanks that may be in fluid communication with each other, such as a first or upper tank and a second or lower tank.

Conduits 70 may include any suitable structure configured to fluidly connect upper portion 74 and lower portion 76. The collection tank may have any suitable number of conduits 70. In some embodiments, one or more of the conduits may be free from a valve and/or other structure configured to regulate flow from the upper portion toward the lower portion. For example, conduits 70 may include one or more passages 82 extending between the upper and lower portions.

Figure 12:
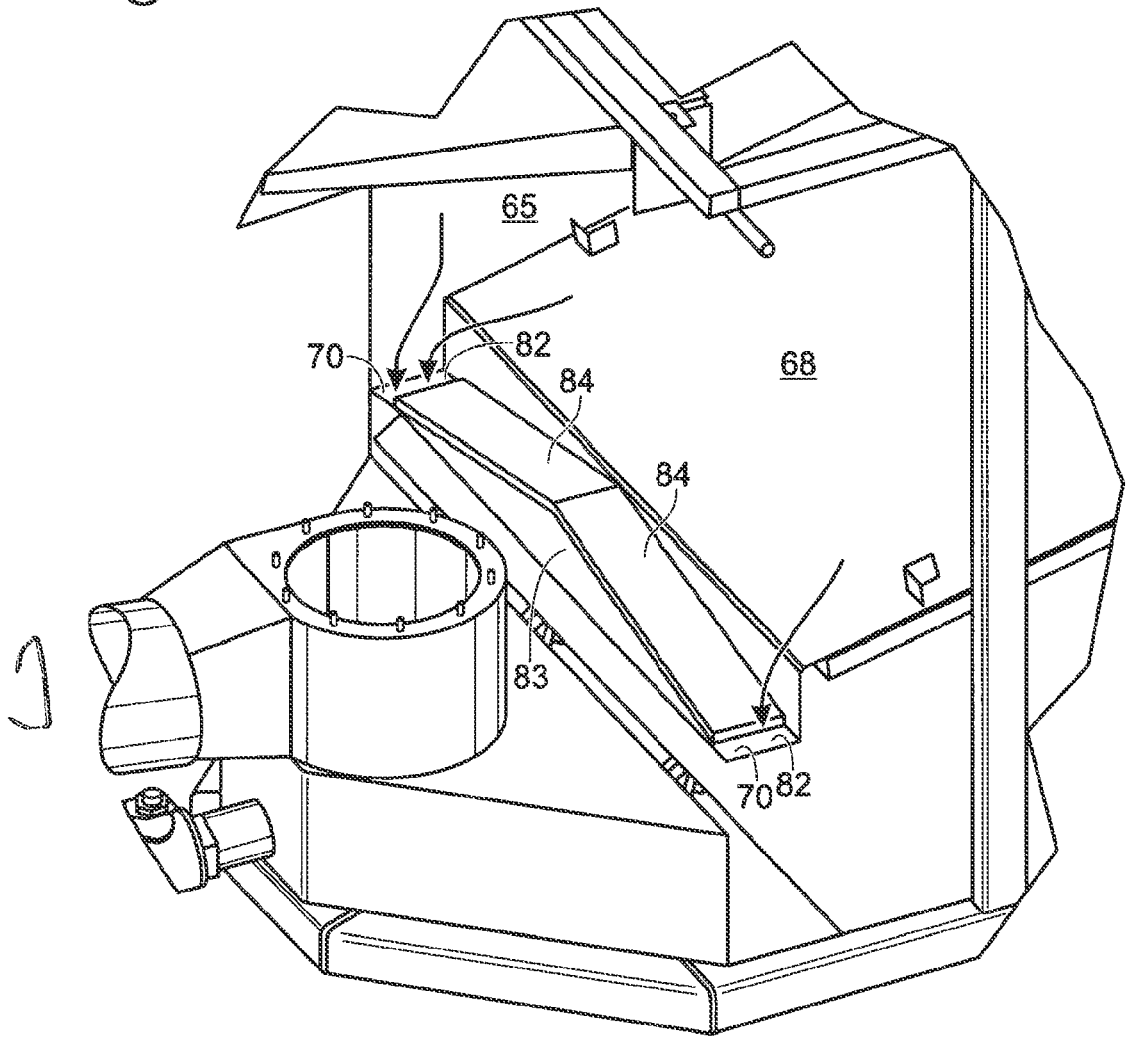
FIG. 12 is a partial isometric view of an internal wall of the material separator system showing illustrative examples of conduits and a flow directing assembly.

Passages 82 may be located at any suitable locations. For example, the passages may be located on and/or adjacent to internal wall 68, as shown in FIG. 12. Alternatively, or additionally, the passages may be spaced from the internal wall, external the upper and/or lower portions, and/or external the tanks walls of the collection tank. Any suitable number of passages 82 may fluidly connect the upper and lower portions. For example, the collection tank may include two passages as shown in FIG. 12. Alternatively, the collection tank may include one, three, four or more passages.

The collection tank may additionally, or alternatively, include at least one flow directing assembly 83, which may include any suitable structure configured to direct fluid from the upper portion toward one or more of the conduits, such as one or more of the passages. For example, the flow directing assembly may include one or more sloped walls 84 that may be sloped toward one or more conduits 70. The sloped walls may be located at any suitable location(s), such as adjacent one or more of the conduits. In some embodiments, the sloped walls or the flow directing assembly may be movably connected, such as to the internal wall, to allow a user to selectively block one or more of the conduits.

Figure 13:
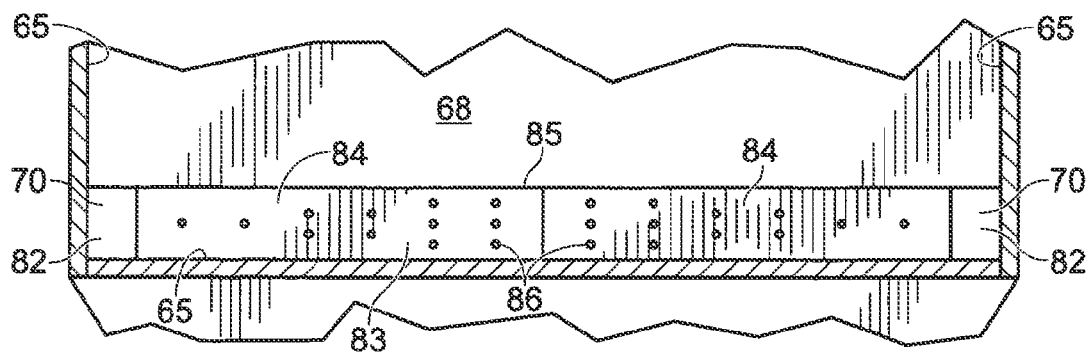
FIG. 13 is a top view of FIG. 12 showing another illustrative example of a flow directing assembly.

The flow directing assembly may additionally, or alternatively, include a bubbler 85, as shown in FIG. 13. The bubbler may include any suitable structure configured to inject fluid into the upper portion, such as through a plurality of apertures 86 on one or more of the sloped walls. The fluid may be from the lower portion, an external source, and/or any other suitable sources. The bubbler may include any suitable mechanism or device, such as a pump (not shown), to inject the fluid into the upper portion.

Although flow directing assembly 83 is shown to include two sloped walls 84, the flow directing assembly may include any suitable number of sloped walls, such as one, three, four or more. Additionally, although sloped walls 84 are shown to be between the passages, the sloped walls may alternatively be between one or more passages. For example, a central passage may be used with two or more sloped walls between that passage.

Conduits 70 may alternatively, or additionally include one or more weirs 87, which may include any suitable structure configured to allow fluid from the upper portion to flow toward the lower portion when a fluid level in the upper portion is beyond a predetermined level. The weirs may be located in any suitable portion(s) of the collection tank, such as spaced from the internal wall, external the upper and/or lower portions, and/or external the tank walls of the collection tank. Collection tank 64 may include any suitable number of weirs 87, such as one, two, three or more weirs. For example, collection tank 64 may include two weirs, one on each side tank wall of the collection tank.

Although weirs 87 are shown to be positioned toward a rear portion of the tank, the weirs may additionally, or alternatively, be positioned on any suitable portions of the tank, include a front portion of the tank. Additionally, although collection tank 64 is shown to include passages 82 and weirs 87 to fluidly connect the upper and lower portions, the collection tank may alternatively, or additionally, include any suitable type(s) of conduits.

For example, the conduit may include a drain valve (such as a flapper valve and/or another suitable valve. The conduit may be positioned at any suitable location. For example, the conduit may be located on internal wall 68 and/or a bottom of the upper portion (or upper. tank).

Alternatively, or additionally, the conduit may include a bypass pipe and a bypass valve. The conduit may be positioned at any suitable location. For example, the conduit may be located external the tank walls of the collection tank. In some embodiments, the conduit may be configured to drain one or more streams of fibrous material B from the upper portion to the lower portion of the collection tank. The collection tank may have two or more conduits located external the tank walls of the tank as an alternative to, or in addition to, one or more conduits located internal the tank.

Fluid collection structure 16 also may include a removal assembly 88, which may include any suitable structure configured to remove one or more materials (such as fibrous material stream(s) B, stream(s) of silt materials, stream(s) of sand materials, and/or other streams of suitable materials) from the fluid in the collection tank. For example, removal assembly 88 may include a drag member 90 (such as a drag chain) and rollers 92, as shown in FIG. 2. The rollers may move drag member 90 such that at least some of the materials may be collected and/or moved by the drag member from the fluid in the collection tank. Those materials may be discharged to a discharge end portion 94 of collection tank 64 to one or more conveyors of conveying structure 18.

Although removal assembly 88 is shown to include drag member 90 and roller 92, the removal assembly may include any suitable structure configured to remove one or more materials from the fluid in the collection tank. Additionally, although fluid collection structure 16 is shown to include collection tank 64 and removal assembly 88, the fluid collection structure may include any suitable structure configured to collect fluid from separating structure 14.

Conveying structure 18 may include any suitable structure configured to transport debris streams and/or materials from the separating structure and/or fluid collection structure to desired location(s), such as desired pile(s) and/or structure(s). For example, conveying structure 18 may include a third conveyor 96, a fourth conveyor 98, and a fifth conveyor 100. The third conveyor may be configured to transport material, such as fibrous material stream(s) B (and/or stream(s) of silt and/or sand materials) from the collection tank, from discharge end portion 94 to the desired location(s). Fourth conveyor 98 may be configured to transport material, such as the rock debris stream, from the second conveyor to the desired location(s), while fifth conveyor 100 may be configured to transport material, such as the wood debris stream, from the first conveyor to the desired location(s).

Although third conveyor 96, fourth conveyor 98, and fifth conveyor 100 are shown to have specific orientations that extend away from the vehicle frame, one or more of those conveyors may include any suitable orientations. In some embodiments, one or more of those conveyors may be selectively adjusted to the desired orientation(s). For example, one or more conveyors may be adjustable conveyors as described in U.S. patent application Ser. Nos. 10/971,355 and 11/053,729, the complete disclosures of which have been incorporated by reference for all purposes. Additionally, although conveying structure 18 is shown to include the third, fourth, and fifth conveyors, the conveying structure may include any suitable number of conveyors and/or any suitable structure configured to transport material from the separating structure and/or fluid collection structure to the desired location(s).

Material separator system 10 may include at least one power supply 102, which may include any suitable structure configured to at least partially provide power to the feed structure, separating structure, fluid collection structure, and/or conveying structure. For example, power supply 102 may include at least one diesel engine 104. Although power supply 102 is shown to include a diesel engine, the power supply may include any suitable power supply configured to at least partially provide power to the feed structure, separating structure, fluid collection structure, and/or conveying structure. For example, the power supply may alternatively, or additionally, include one or more batteries, power cells, gasoline engines, hydraulic systems. Alternatively, or additionally, the power supply may include structure to connect the material separator system to one or more power utility grids.

An illustrative example of the flow of various streams when the material separator system is in operation is shown in FIG. 7. In operation, material separator system 10 may be lowered such that collection tank 64 rests on a ground surface and/or on one or more leveling members. Fluids may be introduced to the mixing tank and/or collection tank to establish operating water levels in the upper and lower portions of the collection. At least one mixed debris stream M may be fed to the feed hopper. Those streams may be moved to the mixing tank via the feed conveyor. In the mixing tank, the mixed debris stream may be contacted with the fluid stream from the fluid ejection assembly.

The fluid stream may push or move material of lower density and/or weight towards the feed end portion of the first conveyor. Additionally, material of higher buoyancy may float and/or move upward the mixing tank to the feed end portion of the first conveyor. The material and/or fluid moved from the feed end portion towards the discharge end portion of the first conveyor may be characterized as first debris stream F or wood debris stream W. From that discharge end portion, the first debris stream may be received by the fifth conveyor, which may move first debris stream F from the discharge end portion of the first conveyor to desired location(s).

In contrast, material of higher density and/or weight (and/or lower buoyancy) may sink or fall down the mixing tank to the feed end portion of the second conveyor. The material and/or fluid moved from the feed end portion towards the discharge end portion of the second conveyor may be characterized as second debris stream S or rock debris stream R. From that discharge end portion, the second debris stream may be received by the fourth conveyor, which may move second debris stream S to desired location(s).

As the first conveyor moves material from its feed end portion towards its discharge end portion, fluid may be drained or removed from the first debris stream to the second conveyor. Fluid from the first debris stream may drain through the open structure of the mesh conveyor belt of the first conveyor.

Similarly, as the second conveyor moves material from its feed end portion towards its discharge end portion, fluid (which may include fluid from the first debris stream) may be drained or removed from the second debris stream to the upper portion of the collection tank. Fluid from the second debris stream may drain through the holes of the non-mesh conveyor belt of the second conveyor. Fluid collected in the upper portion of the collection tank may drain to the lower portion of that tank via the first and/or second conduits. Fibrous material, silt material, and/or sand material in the fluid of the upper portion may drain via the second conduit and/or the first conduit to the lower portion in one or more fibrous material streams B. The fluid may then be moved from the lower portion to the mixing tank via the pump and the pipe.

The fibrous material stream(s) B (and/or stream(s) of silt and/or sand materials) may be moved to the discharge end portion of the collection tank via the drag member and the rollers. From the discharge end portion, fibrous material streams B may be received by the third conveyor and may be moved to desired location(s). However, the steps discussed above may be performed in different sequences and/or in different combinations, not all steps being required for all embodiments of the material separator system.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A vehicle for separating a mixed debris stream, comprising:
   an elongate vehicle frame;
   a separating structure mounted on the vehicle frame and configured to contact the mixed debris stream with a fluid stream to separate the mixed debris stream into at least a first debris stream and a second debris stream, the second debris stream including at least some material of a higher density than material from the first debris stream;
   a feed conveyor having a discharge end portion and configured to transport the mixed debris stream to the separating structure;
   a first conveyor having a feed end portion positioned to receive the first debris stream from the separating structure, and a discharge end portion spaced from the feed end portion of the first conveyor;
   a second conveyor having a feed end portion positioned to receive the second debris stream from the separating structure, and a discharge end portion spaced from the feed end portion of the second conveyor; and
   a feed adjusting structure configured to selectively adjust the position of the discharge end portion of the feed conveyor with respect to the separating structure, thereby selectively adjusting a delivery location of the mixed debris stream, wherein the feed adjusting structure includes one or more adjusting members and a control mechanism, the one or more adjusting members coupled between the feed conveyor and a fixed support structure and the control mechanism configured to selectively actuate the one or more adjusting members to adjust the position of the discharge end portion of the feed conveyor.

2. The vehicle of claim 1, further including a separator adjusting structure configured to selectively adjust the position of the feed end portion of the first conveyor with respect to the separating structure, thereby adjusting a receiving location of the first debris stream.

3. A vehicle for separating a mixed debris stream, comprising:
   an elongate vehicle frame;
   a separating structure mounted on the vehicle frame and configured to contact the mixed debris stream with a fluid stream to separate the mixed debris stream into at least a first debris stream and a second debris stream, the second debris stream including at least some material of a higher density than material from the first debris stream;
   a feed conveyor having a discharge end portion and configured to transport the mixed debris stream to the separating structure;
   a first conveyor having a feed end portion positioned to receive the first debris stream from the separating structure, and a discharge end portion spaced from the feed end portion of the first conveyor;
   a second conveyor having a feed end portion positioned to receive the second debris stream from the separating structure, and a discharge end portion spaced from the feed end portion of the second conveyor; and
   a feed adjusting structure configured to selectively adjust the position of the discharge end portion of the feed conveyor with respect to the separating structure, thereby selectively adjusting a delivery location of the mixed debris stream;

wherein the separating structure includes a mixing area and a fluid ejection assembly, the fluid ejection assembly including a fluid pipe having an end portion adjacent the mixing area and a fluid channeler pivotably connected to the end portion of the fluid pipe, wherein the fluid channeler is configured to be selectively pivoted relative to the end portion of the fluid pipe to adjust an ejection angle of the fluid stream from the end portion of the fluid pipe relative to a horizontal plane.

4. The vehicle of claim 1 wherein the one or more adjusting members include at least one of a hydraulic cylinder and/or a pneumatic cylinder.

5. The vehicle of claim 4 wherein the one or more adjusting members are coupled to a valve bank, and the control mechanism is configured to wirelessly communicate with the valve bank to command the valve bank to selectively deliver actuating fluid to the one or more adjusting members.

6. The vehicle of claim 1, wherein the feed adjusting structure is configured to selectively adjust the position of the discharge end portion of the feed conveyor along a feed adjustment axis, the feed adjustment axis being oriented substantially horizontally toward and/or away from the feed end portion of the first conveyor.

7. A vehicle for separating a mixed debris stream, comprising:
an elongate vehicle frame;
a separating structure mounted on the vehicle frame and configured to contact the mixed debris stream with a fluid stream to separate the mixed debris stream into at least a first debris stream and a second debris stream, the second debris stream including at least some material of a higher density than material from the first debris stream;
a first conveyor having a feed end portion positioned to receive the first debris stream from the separating structure, and a discharge end portion spaced from the feed end portion of the first conveyor;
a second conveyor having a feed end portion positioned to receive the second debris stream from the separating structure, and a discharge end portion spaced from the feed end portion of the second conveyor;
a separator adjusting structure configured to selectively adjust the position of the feed end portion of the first conveyor with respect to the separating structure, thereby adjusting a receiving location of the first debris stream, wherein the separator adjusting structure includes one or more adjusting members and a control mechanism, the one or more adjusting members coupled between the first conveyor and a fixed support structure and the control mechanism configured to selectively actuate the one or more adjusting members to adjust the position of the feed end portion of the first conveyor.

8. A vehicle for separating a mixed debris stream, comprising:
an elongate vehicle frame;
a separating structure mounted on the vehicle frame and configured to contact the mixed debris stream with a fluid stream to separate the mixed debris stream into at least a first debris stream and a second debris stream, the second debris stream including at least some material of a higher density than material from the first debris stream;
a first conveyor having a feed end portion positioned to receive the first debris stream from the separating structure, and a discharge end portion spaced from the feed end portion of the first conveyor;
a second conveyor having a feed end portion positioned to receive the second debris stream from the separating structure, and a discharge end portion spaced from the feed end portion of the second conveyor;
a separator adjusting structure configured to selectively adjust the position of the feed end portion of the first conveyor with respect to the separating structure, thereby adjusting a receiving location of the first debris stream;
wherein the separating structure includes a mixing tank and a fluid ejection assembly, the fluid ejection assembly including a fluid pipe having an end portion adjacent the mixing tank and a fluid channeler pivotably connected to the end portion of the fluid pipe, wherein the fluid channeler is configured to be selectively pivoted relative to the end portion of the fluid pipe to adjust an ejection angle of the fluid stream from the end portion of the fluid pipe relative to a horizontal plane.

9. The vehicle of claim 7, wherein the one or more adjusting members include at least one of a hydraulic cylinder and/or a pneumatic cylinder.

10. The vehicle of claim 9, wherein the one or more adjusting members are coupled to a valve bank, and the control mechanism is configured to wirelessly communicate with the valve bank to command the valve bank to selectively deliver actuating fluid to the one or more adjusting members.

11. A vehicle for separating a mixed debris stream, comprising:
an elongate vehicle frame;
a separating structure mounted on the vehicle frame and configured to contact the mixed debris stream with a fluid stream to separate the mixed debris stream into at least a first debris stream and a second debris stream, the second debris stream including at least some material of a higher density than material from the first debris stream;
a first conveyor having a feed end portion positioned to receive the first debris stream from the separating structure, and a discharge end portion spaced from the feed end portion of the first conveyor;
a second conveyor having a feed end portion positioned to receive the second debris stream from the separating structure, and a discharge end portion spaced from the feed end portion of the second conveyor;
a separator adjusting structure configured to selectively adjust the position of the feed end portion of the first conveyor with respect to the separating structure, thereby adjusting a receiving location of the first debris stream;
wherein the separating structure includes a mixing tank, and wherein the first conveyor includes first and second side walls that move with the feed end portion of the first conveyor, the first side wall coupled between a first trap wall of the mixing tank and the second side wall coupled between a second trap wall of the mixing tank, the first and second trap walls configured to prevent leakage through sides of the mixing tank when the position of the feed end portion of the first conveyor is adjusted.

12. The vehicle of claim 7, wherein the separating structure is configured to contact the mixed debris stream in a contact region, and wherein the separator adjusting structure is configured to selectively adjust the position of the feed end portion of the first conveyor along a separator adjustment axis to move the feed end portion of the first conveyor toward and/or away from the contact region.

13. A vehicle for separating a mixed debris stream, comprising:
- an elongate vehicle frame;
- a mixing tank configured to receive the mixed debris stream;
- a fluid ejection assembly adjacent the mixing tank and configured to contact the mixed debris stream with a fluid stream to separate the mixed debris stream into at least a first debris stream and a second debris stream, the second debris stream including at least some material of a higher density than material from the first debris stream;
- a feed conveyor having a discharge end portion and configured to deliver the mixed debris stream to the mixing tank at a delivery location;
- a first conveyor having a feed end portion positioned to receive the first debris stream from the mixing tank, and a discharge end portion spaced from the feed end portion of the first conveyor;
- a second conveyor having a feed end portion positioned to receive the second debris stream from the separating structure, and a discharge end portion spaced from the feed end portion of the second conveyor; and
- a feed adjusting structure configured to selectively adjust the position of the discharge end portion of the feed conveyor with respect to the mixing tank, thereby selectively adjusting a delivery location of the mixed debris stream; and
- a separator adjusting structure configured to selectively adjust the position of the feed end portion of the first conveyor with respect to the mixing tank, thereby adjusting a receiving location of the first debris stream.

14. The vehicle of claim 13, wherein the fluid ejection assembly includes a fluid pipe having an end portion adjacent the mixing area and a fluid channeler pivotably connected to the end portion of the fluid pipe, wherein the fluid channeler is configured to be selectively pivoted relative to the end portion of the fluid pipe to adjust an ejection angle of the fluid stream from the end portion of the fluid pipe relative to a horizontal plane.

15. The vehicle of claim 14, wherein the fluid channeler includes a flap pivotably coupled to the end portion of the fluid pipe by a rotating rod, the rotating rod coupled to a lever arm configured to be selectively actuated to rotate the rotating rod and thereby pivot the flap.

16. The vehicle of claim 13 wherein the feed adjusting structure includes one or more first fluid-actuated cylinders coupled between the feed conveyor and a first fixed support structure, the one or more first fluid-actuated cylinders configured to adjust the position of the discharge end portion of the feed conveyor along a feed adjustment axis when the one or more first fluid-actuated cylinders are actuated, and wherein the separator adjusting structure includes one or more second fluid-actuated cylinders coupled between the first conveyor and a second fixed support structure, the one or more second fluid-actuated cylinders configured to adjust the position of the feed end of the first conveyor when the one or more second fluid actuated cylinders are actuated.

17. The vehicle of claim 16, wherein the one or more first fluid-actuated cylinders and the one or more second fluid-actuated cylinders are coupled to a valve bank configured to deliver actuating fluid to and/or release actuating fluid from the first and second fluid-actuated cylinders, and the vehicle further comprising a controller configured to control the valve bank to selectively actuate one or more of the first fluid-actuated cylinders and/or second fluid-actuated cylinders.

18. The vehicle of claim 13, wherein the mixing tank includes first and second trap walls, and wherein the first conveyor includes first and second side walls that move with the feed end portion of the first conveyor, the first side wall coupled between the first trap wall of the mixing tank and the second side wall coupled between the second trap wall of the mixing tank, the first and second trap walls configured to prevent leakage through sides of the mixing tank when the position of the feed end portion of the first conveyor is adjusted.

* * * * *